United States Patent [19]
Suda

[11] Patent Number: 6,112,029
[45] Date of Patent: Aug. 29, 2000

[54] CAMERA, EXCHANGEABLE LENS, AND CAMERA SYSTEM

[75] Inventor: Yasuo Suda, Yokohama, Japan

[73] Assignee: Canon Kabushiki Kaisha, Tokyo, Japan

[21] Appl. No.: 09/189,723

[22] Filed: Nov. 12, 1998

[30] Foreign Application Priority Data

Nov. 13, 1997 [JP] Japan .................................. 9-327235

[51] Int. Cl.[7] .................................................. G03B 13/36
[52] U.S. Cl. ............................ 396/92; 396/123; 396/147
[58] Field of Search ............................ 396/92, 121, 123, 396/122, 147

[56] References Cited

U.S. PATENT DOCUMENTS

| | | | |
|---|---|---|---|
| 4,698,492 | 10/1987 | Ohtaka et al. | 250/201 |
| 4,745,426 | 5/1988 | Suda et al. | 354/407 |
| 4,777,506 | 10/1988 | Hiramatsu | 354/408 |
| 4,903,065 | 2/1990 | Taniguchi et al. | 396/92 |
| 4,914,282 | 4/1990 | Akashi et al. | 250/201.8 |
| 5,053,803 | 10/1991 | Suda et al. | 354/466 |
| 5,130,740 | 7/1992 | Suda et al. | 354/479 |
| 5,182,443 | 1/1993 | Suda et al. | 250/201.2 |
| 5,214,464 | 5/1993 | Karasaki et al. | 396/92 |
| 5,473,403 | 12/1995 | Suda et al. | 396/147 X |
| 5,734,428 | 3/1998 | Suda et al. | 348/341 |

FOREIGN PATENT DOCUMENTS

| | | |
|---|---|---|
| 5-323182 | 12/1993 | Japan . |
| 6-19488 | 3/1994 | Japan . |
| 6-90349 | 11/1994 | Japan . |
| 7-62731 | 7/1995 | Japan . |

*Primary Examiner*—W. B. Perkey
*Attorney, Agent, or Firm*—Fitzpatrick, Cella, Harper & Scinto

[57] ABSTRACT

A camera which uses exchangeable photographing lenses, and is capable of focus detection using a plurality of focus areas, includes a memory for storing information pertaining to the number of focus areas that can be used in focus detection in units of mountable photographing lenses, and a microprocessor for controlling focus detection on the basis of information corresponding to the photographing lens mounted, of the information stored in the memory.

23 Claims, 23 Drawing Sheets

FIG. 12
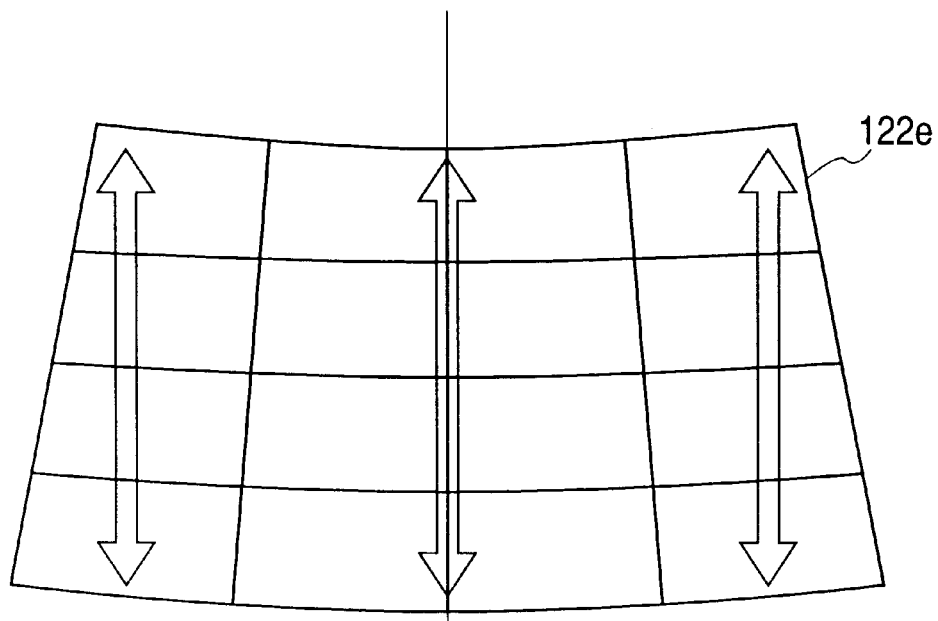
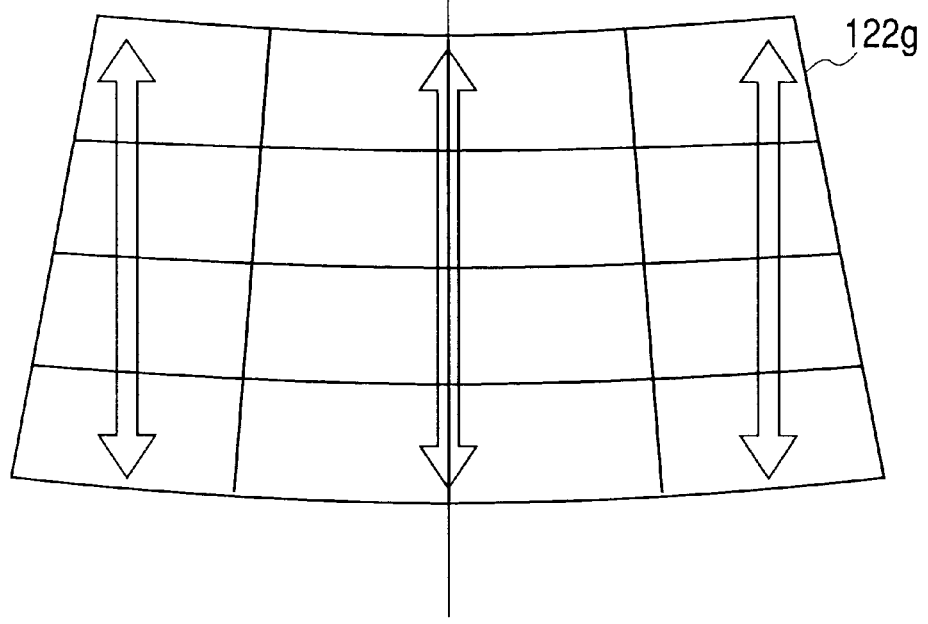

FIG. 20
A   B   C

FIG. 23

| TL6 | TL4 | TL2 | T0 | TR2 | TR4 | TR6 |
|---|---|---|---|---|---|---|
| A | A | A | A | A | A | A |
| C | C | A | A | A | C | C |

| UL9 | UL7 | UL5 | UL3 | UL1 | UR1 | UR3 | UR5 | UR7 | UR9 |
|---|---|---|---|---|---|---|---|---|---|
| B | B | B | B | B | B | B | B | B | B |
| B | | | B | B | B | B | | | B |

| CL10 | CL8 | CL6 | CL4 | CL2 | C0 | CR2 | CR4 | CR6 | CR8 | CR10 |
|---|---|---|---|---|---|---|---|---|---|---|
| A | A | A | A | A | A | A | A | A | A | A |
| A | A | A | A | A | A | A | A | A | A | A |

| DL9 | DL7 | DL5 | DL3 | DL1 | DR1 | DR3 | DR5 | DR7 | DR9 |
|---|---|---|---|---|---|---|---|---|---|
| B | C | C | B | B | B | B | C | C | B |
| B | B | B | B | B | B | B | B | B | B |

| BL6 | BL4 | BL2 | B0 | BR2 | BR4 | BR6 |
|---|---|---|---|---|---|---|
| A | A | A | A | A | A | A |
| A | A | A | A | A | A | A |

FIG. 26A

| PHOTOGRAPHING LENS SYSTEM | MASTER LENS ONLY | PHOTOGRAPHING LENS SYSTEM INCLUDING TELECONVERSION LENS |
|---|---|---|
| FIRST FOCUS DETECTING SYSTEM | ALL FOCUS DETECTING AREAS | UL1, UR1, CL2, C0, CR2, DL1, DR1 |
| SECOND FOCUS DETECTING SYSTEM | UL1, UR1, C0, DL1, DR1 | NON |

(FOCUS DETECTING AREAS INCLUDING NO ECLIPSE WHEN RANGE RING IS INFINITE)

FIG. 26B

| FULL F NUMBER | NOT LARGER THAN F2.8 | NOT LARGER THAN F5.6 | OVER F5.6 |
|---|---|---|---|
| FIRST FOCUS DETECTING SYSTEM | ALL FOCUS DETECTING AREAS | ALL FOCUS DETECTING AREAS | CHANGE IN ACCORDANCE WITH EXIT WINDOW |
| SECOND FOCUS DETECTING SYSTEM | ALL FOCUS DETECTING AREAS | CHANGE IN ACCORDANCE WITH EXIT WINDOW | NON |

(FOCUS DETECTING AREAS INCLUDING NO ECLIPSE WHEN FULL F NUMBER CHANGES IN ACCORDANCE WITH CHANGE OF ZOOMING POSITION OR THE LIKE)

FIG. 27

| FULL F NUMBER | | NOT LARGER THAN F2.8 | NOT LARGER THAN F5.6 | OVER F5.6 |
|---|---|---|---|---|
| FIRST FOCUS DETECTING SYSTEM | | ALL FOCUS DETECTING AREAS | ALL FOCUS DETECTING AREAS | CENTER OR NON |
| SECOND FOCUS DETECTING SYSTEM | | ALL FOCUS DETECTING AREAS | CENTER OR NON | NON |
| DISPLAY MODE | ARBITRARY SELECTION | FIG. 3A | FIG. 3A | FIG. 3C OR 3D |
| | AUTOMATICALLY SELECTION | FIG. 3B | FIG. 3B | FIG. 3C OR 3D |

CAMERA, EXCHANGEABLE LENS, AND CAMERA SYSTEM

BACKGROUND OF THE INVENTION

1. Field of the Invention

The present invention relates to improvements in a camera, which has a focus detecting device having, in a photographing frame, a plurality of focus detecting fields or areas that allow focus detection using outputs from some pixels of a photoelectric conversion element, an exchangeable lens device, and a camera system.

2. Related Background Art

As a conventional focus detecting device for a camera, a TTL (Through The Lens) phase difference detection type focus detecting device is known. In the TTL phase difference detecting system, object images are formed using two light beams that have passed through different portions of the pupil of a photographing lens, and the phase difference between the positions of the two object images is detected and is converted into a defocus amount of the photographing lens.

This focus detecting system is suitable for a camera system using exchangeable photographing lenses, since the amount of defocus can be detected irrespective of the focal length of the photographing lens, and the size of each focus detecting area is fixed independently of the focus length of the photographing lens. In recent years, a TTL phase difference detection type focus detecting device having a plurality of focus detecting areas also has become commercially available.

In the TTL phase difference detection type focus detecting device, the focus detecting precision suffers considerably when some light components of a focus detecting light beam are eclipsed. Hence, a photographing lens to be mounted must have a pupil size that does not eclipse any light components for each focus detecting area. For this reason, when various types of photographing lenses are applied to an automatic focus adjustment camera system, two methods may be used. In the first method, use of photographing lenses other than those that can effect all the focus detecting areas of the camera main body is inhibited. In the second method, whether or not focus detection is permitted or its result is used is determined in units of focus detecting areas in correspondence with the state of, e.g., the photographing lens.

In a system arrangement that uses the first method, an incoming focus detecting light beam on the respective focus detecting areas is free from any eclipse for all the focal lengths of all the photographing lenses to be mounted. That is, the photographing lenses do not limit any focus detecting light beams at all focal lengths.

In a system arrangement that uses the second method, an incoming focus detecting light beam on the respective focus detecting areas is likely to be eclipsed depending on the focal length of the photographing lens to be mounted. That is, the photographing lens may limit the focus detecting light beam depending on its focal length.

Photographing lenses which satisfy, e.g., the following conditions can be subjected to automatic focus adjustment in the system arrangement that uses the first method:

1) a photographing lens which has a given brightness, i.e., having a full F number that does not exceed F5.6; or
2) a photographing lens having a special exit window even when it has given darkness.

Note that "the photographing lens having a special exit window" is the one which has an exit window with a position and shape at the central values of the entire photographing lens group, and for example, a reflection optical system can be used as one of such lenses.

In this automatic focus detecting camera system, any photographing lenses which are not darker than at least F5.6 can be mounted on the camera to perform automatic focus adjustment.

In the system arrangement that uses the second method, the number of photographing lenses that can be used can be increased. By contrast, since the degree of freedom on the camera side can be increased, focus detecting areas can be located over a broader range.

In a camera disclosed in Japanese Patent Publication No. 6-90349, when the largest full F number in the zooming range of a photographing lens is output to determine if focus detection of the camera is permitted, focus detection can be done using the maximum number of focus detecting areas. This is because, when a focus detecting light beam is likely to be eclipsed upon zooming of the photographing lens, focus detection can be inhibited in advance.

On the other hand, a camera disclosed in Japanese Patent Publication No. 7-62731 has two TTL focus detecting systems having different distance measurement base lengths, and the similarity between a pair of image signals is detected to select one of these focus detecting systems.

When a plurality of focus detecting areas are selectively used for focus detection depending on the nature of the photographing lens mounted or the states of image signals, since the imaging position of the photographing lens can be controlled on the basis of focus detecting information from only focus detecting areas, the focus detecting precision of which is optically guaranteed, an accurately focused photograph can be taken.

Among such known system arrangements, assume a case wherein a teleconversion lens for extending the focal length of a photographing lens is additionally mounted. For example, in the case examined below, a photographing lens having a focal length=300 mm and full F number=4 is used as a master lens, a rear converter optical system for doubling the focal length is used as a teleconversion lens, and a camera having a total of five focus detecting areas at the center, and right and left positions of the frame is used.

At this time, a photographing lens system as a combination of the master lens and teleconversion lens has "focal length=600 mm/full F number=8". As disclosed in Japanese Patent Publication No. 6-19488, a system, which comprises a lens drive means in a teleconversion lens for increasing the focal length of a photographing lens, and uses a master lens dedicated to manual focusing, can be considered a typical example of such lens system.

The master lens is capable of automatic focus adjustment in either system arrangement using the first or second method, since the full F number of its specifications "300 mm/F4" is brighter than F5.6.

However, the full F number of the photographing lens system including the teleconversion lens is F8, which is darker than F5.6. Since this lens system is not a photographing lens having a special exit window, the system arrangement that uses the first method cannot use this photographing lens system as an automatic focus adjustment system. That is, manual focusing must be done when this system is used.

On the other hand, since the system arrangement that uses the second method determines in units of focus detecting areas depending on the state of the photographing lens and the like whether or not focus detection is permitted or its detection result is used, three focus detecting areas near the optical axis, i.e., the center of the photographing lens may be used in focus detection.

That is, as explained in Japanese Patent Application Laid-open No. 5-323182, whether or not a focus detecting light beam is likely to be eclipsed by focus detecting areas at off-axis positions is determined by the relationship between each focus detecting area and the exit window of the photographing lens system corresponding to that focus detecting area position. If eclipse takes place, the pair of image signals obtained have poor similarity in many cases, and the focus detection result cannot be used in such case. Therefore, if eclipse is predicted, focus detection of the corresponding focus detecting areas must be inhibited.

SUMMARY OF THE INVENTION

One aspect of the invention is to provide a camera which uses exchangeable photographing lenses and is capable of focus detection using a plurality of focus areas, comprising storage means for storing information pertaining to the number of focus areas that can be used in focus detection in units of mountable photographing lenses, and control means for controlling focus detection on the basis of information corresponding to a photographing lens mounted among the informations stored in the storage means, whereby the number of focus areas that can be used in focus detection can be appropriately set depending on the mounted photographing lens.

BRIEF DESCRIPTION OF THE DRAWINGS

FIG. 9 is a view showing the state of a secondary object image on an area sensor shown in FIG. 3 and the like;

FIG. 10 is a partial plan view of the area sensor shown in FIG. 3 and the like;

FIG. 12 is a view showing the moving direction of an object image in accordance with changes in defocus of a photographing lens in the embodiment of the present invention;

FIG. 15 is a plan view of the area sensor shown in FIG. 3 and the like;

FIG. 20 is a view showing different types of sensor arrays in the embodiment of the present invention;

FIG. 23 is a view showing the types of sensor arrays in the respective focus detecting areas in the embodiment of the present invention;

FIGS. 26A and 26B are tables showing the relationship between focus detecting areas free from any eclipse of a focus detecting light beam and the full F number in the first and second focus detecting systems; and FIG. 27 is a table for showing the state and display mode in the embodiment of the present invention in correspondence with FIGS. 26A and 26B.

DESCRIPTION OF THE PREFERRED EMBODIMENTS

The present invention will be described in detail hereinafter on the basis of the illustrated embodiment.

Figure 4:
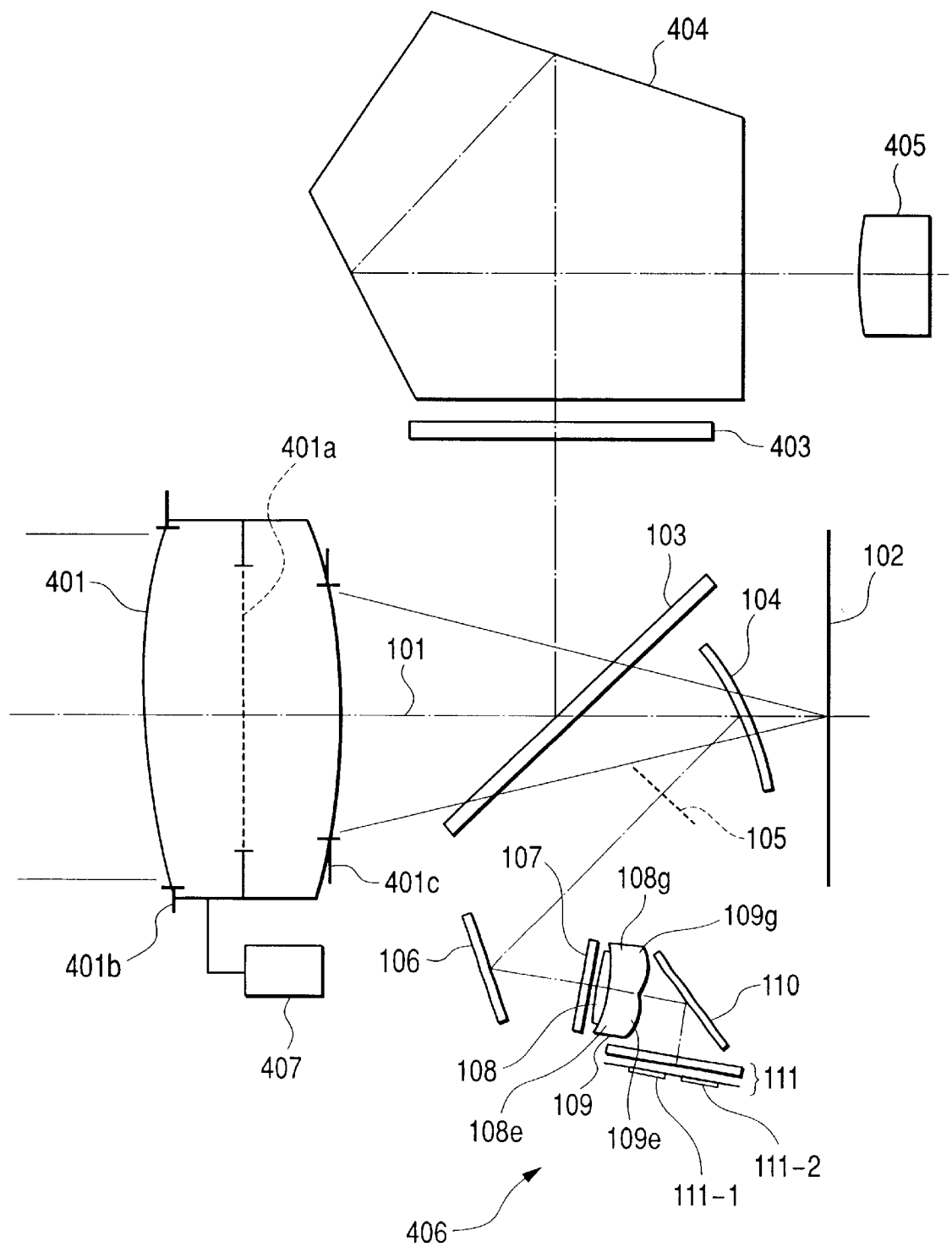
FIG. 4 is a view showing the layout of an optical system of the camera system according to the embodiment of the present invention.
Figure 5:
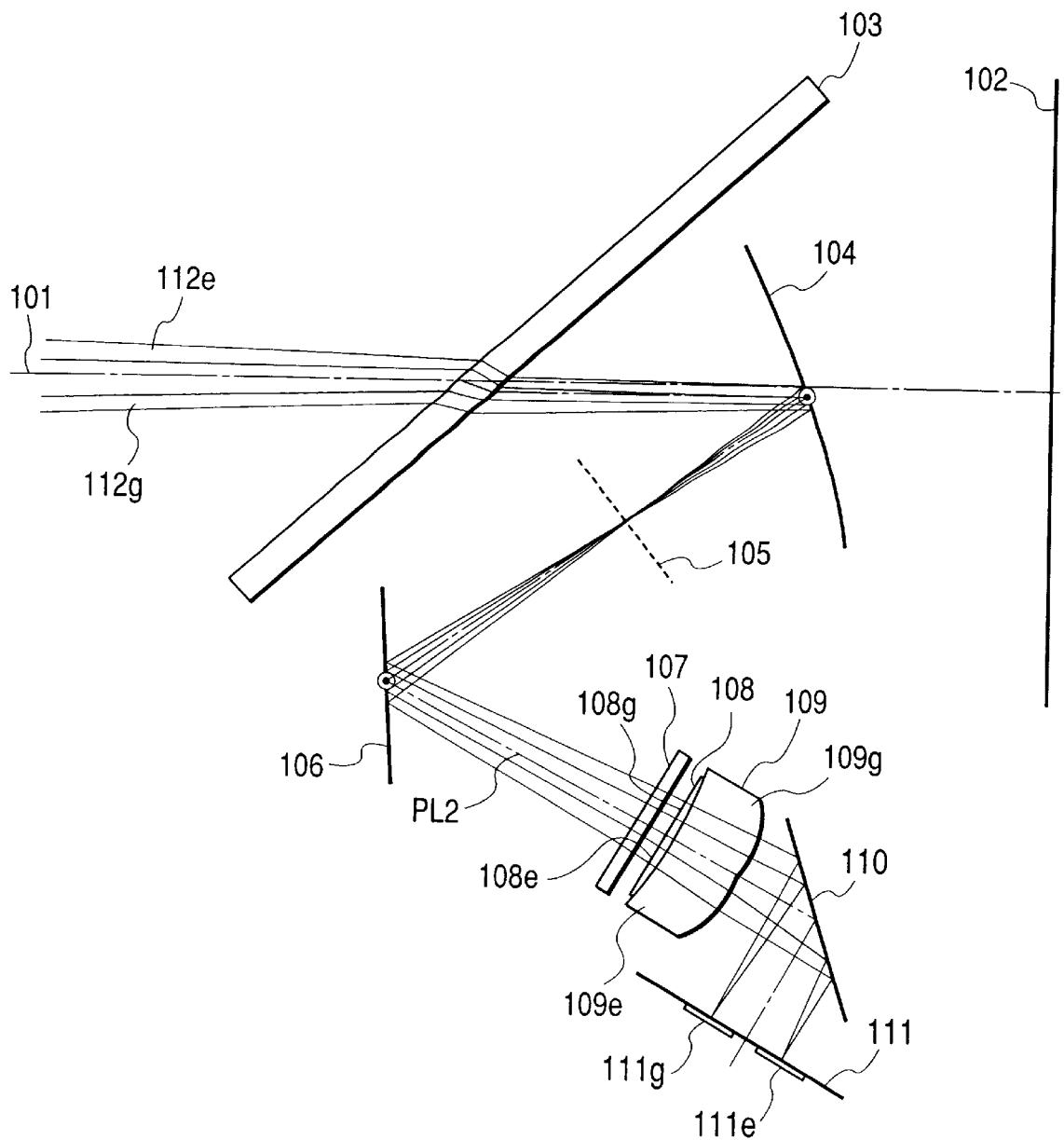
FIG. 5 is a view showing a principal part of the optical system of a focus detecting device according to the embodiment of the present invention.
Figure 6:
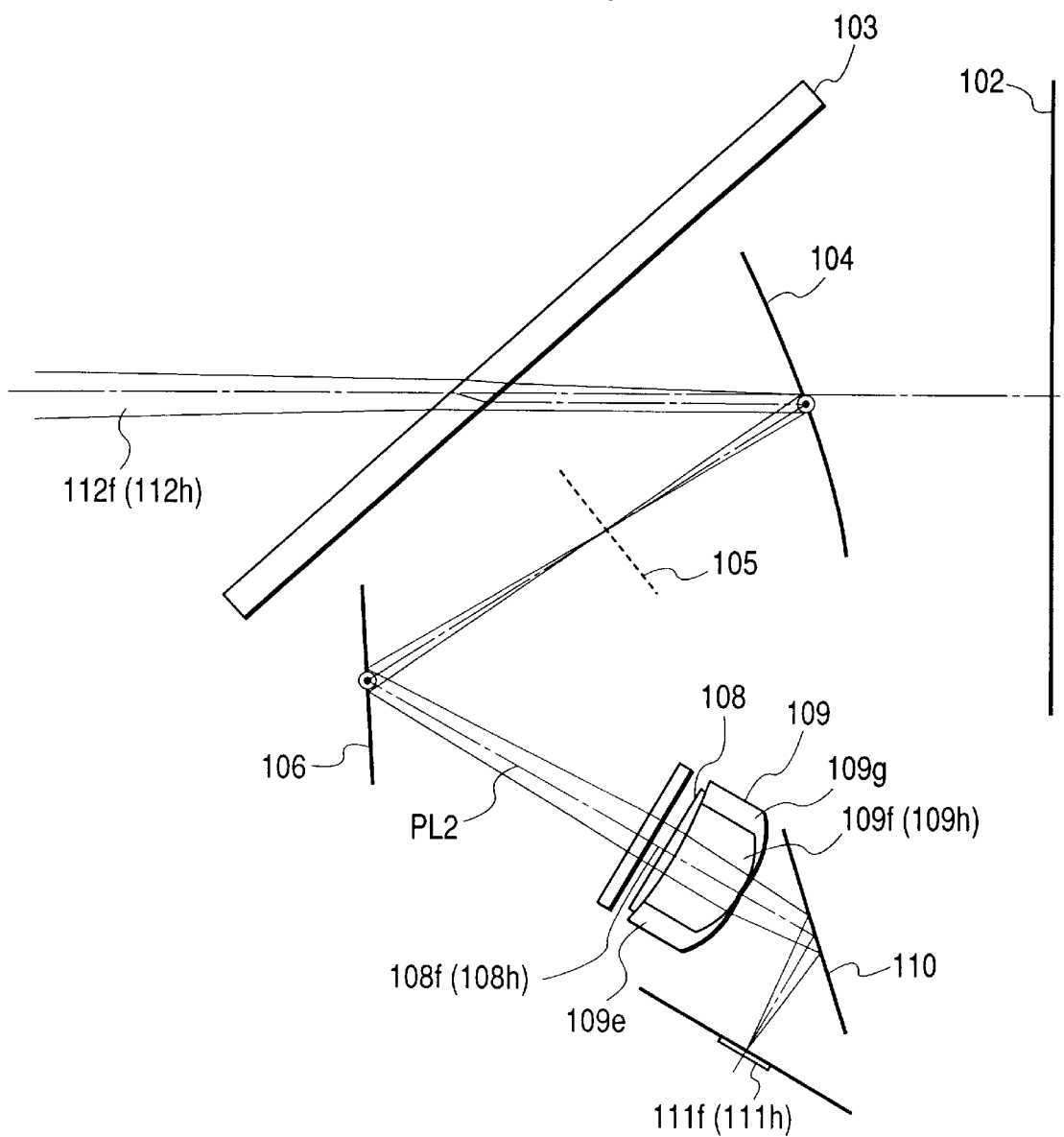
FIG. 6 is a view showing a principal part of the optical system of the focus detecting device according to the embodiment of the present invention when viewed from a direction different from FIG. 5.

FIG. 4 shows a principal part of a camera that constructs a camera system of the present invention, and FIGS. 5 and 6 show a principal part of a focus detecting device.

The focus detecting device has a detecting system for splitting the pupil of a photographing lens vertically and a detecting system for splitting the pupil horizontally. FIGS. 5 and 6 respectively show the optical paths of the former and latter systems projected onto a plane including the optical axis of the photographing lens.

In these figures, the camera system includes a camera body 406, a photographing lens 401 having a stop 401a, front aperture 401b, and rear aperture 401c, a lens drive device 407, an optical axis 101 of the photographing lens, and an image plane 102 on which imaging means such as a photographing film or CCD is located. Also, the camera system includes a main mirror 103 which is located on the optical axis 101 of the photographing lens and has a central semi-transparent region, a focusing screen 403, a pentagonal prism 404, an eyepiece 405, a first reflection mirror 104 which is obliquely located on the optical axis 101 of the photographing lens, a paraxial image plane 105 which is formed by the first reflection mirror 104 to be conjugate with the image plane 102, a second reflection mirror 106, an infrared ray cut filter 107, a stop 108 having four apertures, a reimage lens block 109 having four lens portions corresponding to the apertures of the stop, a third reflection mirror 110, and an area sensor 111 having two pairs of two-dimensional light-receiving areas 111-1 and 111-2.

Each light-receiving area is formed by a plurality of sensor arrays each consisting of a large number of pixels having identical light-receiving apertures, and the sensor arrays also form pairs. Note that the first reflection mirror 104 is an elliptic mirror, and two focal points that define an ellipse are respectively located on the line extending the optical path after a light ray on the optical axis 101 of the photographing lens is refracted by the main mirror 103 toward the photographing lens 401 side, and on the line extending the optical path after that light ray is reflected by the first reflection mirror 104. Since the first reflection mirror 104 also serves as a field mask for limiting focus detecting areas, only its necessary region reflects light. The second and third reflection mirrors 106 and 110 are plane mirrors. Note that portions with optical functions of these building elements have a symmetric arrangement with respect to the plane of paper.

Figure 7:
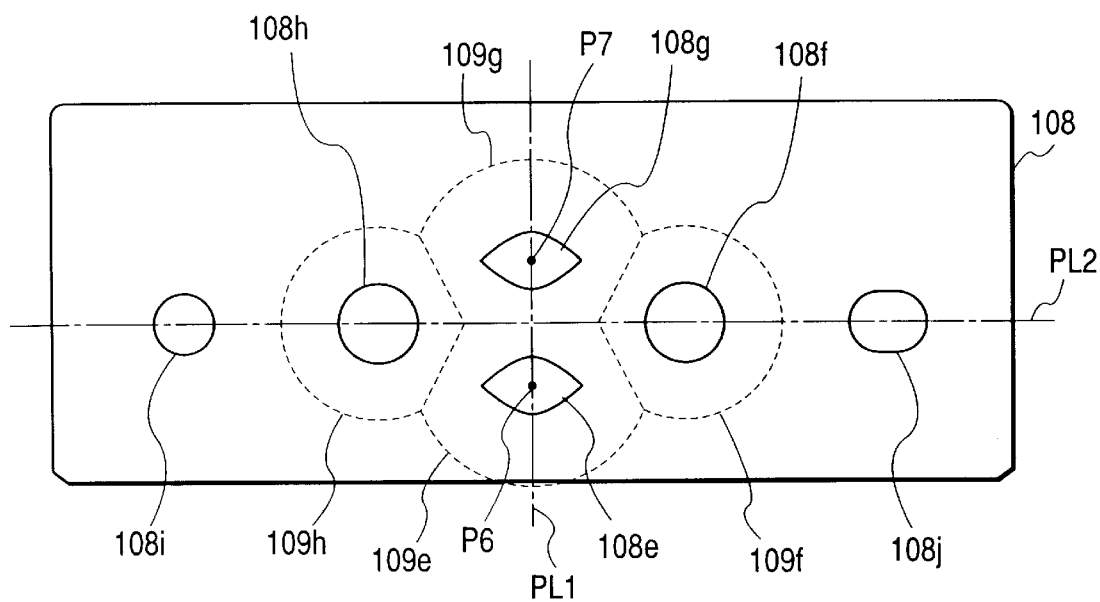
FIG. 7 is a plan view showing a stop as one constituent elements of the optical system of the focus detecting device according to the embodiment of the present invention.

FIG. 7 is a plan view of the stop 108, which is formed of a metal or resin light-shielding thin plate.

Referring to FIG. 7, the stop 108 has aperture stops 108e to 108h, and positioning holes 108i and 108j. The stop 108 is fixed to the reimage lens block 109 via the positioning holes 108i and 108j. The light entrance side of the reimage lens block 109 has a single concave spherical surface, which has the center on the optical axis of the photographing lens 401 that is deflected by the first reflection mirror 104, and the exit side has two pairs of convex lenses 109e to 109h which are decentered in opposite directions. Furthermore, the center of the concave spherical surface is located on the paraxial image plane 105 of the photographing lens 401, which is formed by the first reflection mirror 104, and the centers of the two pairs of convex lenses 109e to 109h are located in the vicinity of the centers of the aperture stops. With such power layout of the lenses, high-precision focus detection can be attained over a broad light wavelength range.

The positional relationship between the stop 108 and reimage lens block 109 is set so that the two pairs of lenses 109e to 109h are located behind the stop 108, as indicated by the broken lines in FIG. 7. Hence, each aperture stop itself serves as the entrance pupil of a reimage optical system. The centers of gravity of the apertures of the aperture stops 108e and 108g are located on a first plane PL1 which is parallel to the optical path near the optical axis of the photographing lens 401, and includes centers P6 and P7 of curvature of the lenses 109e and 109g, and the centers of gravity of the apertures of the aperture stops 108f and 108h and the centers of curvature of the lenses 109f and 109h are located on a second plane PL2 which includes the optical path near the optical axis of the photographing lens 401 and is perpendicular to the first plane PL1.

The optical paths of focus detecting light beams correspond to combinations of the aperture stops and lenses with identical suffices, and a light beam which has passed through each aperture forms a secondary object image on the area sensor 111. Note that light beams that have passed through elements with different suffices do not contribute to focus detection since they do not reach desired positions on the area sensor 111. A detecting system that uses a light beam which passes through elements with suffices e and g splits the exit pupil of the photographing lens 401 vertically, while a detecting system that uses a light beam which passes through elements with suffices f and h splits the exit pupil of the photographing lens 401 horizontally. The detecting system that splits the pupil vertically will be referred to as a first detecting system hereinafter, and the detecting system that splits the pupil horizontally will be referred to as a second focus detecting system hereinafter.

Figure 8:
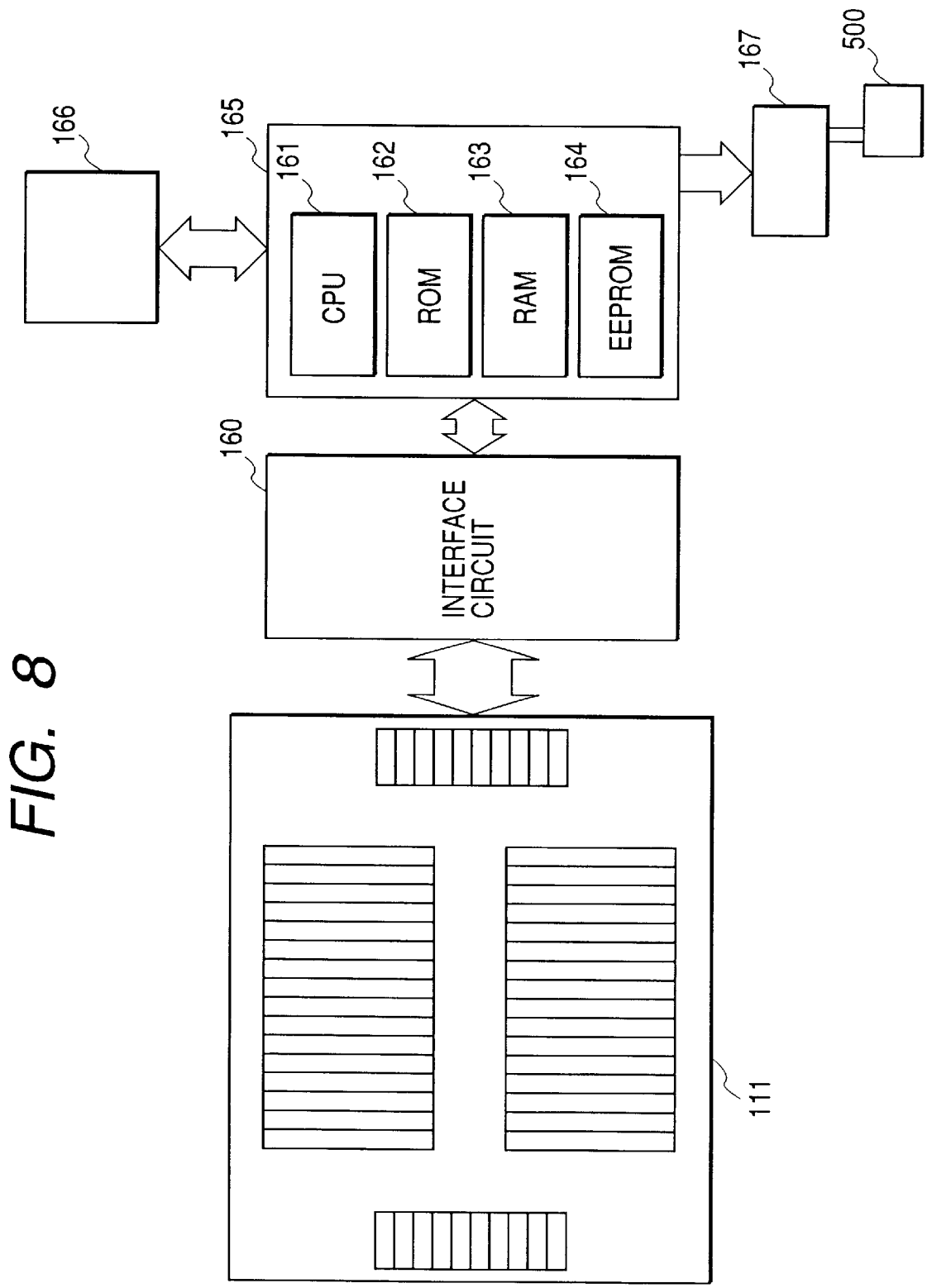
FIG. 8 is a schematic block diagram showing the circuit arrangement of the focus detecting device according to the embodiment of the present invention.

FIG. 8 is a block diagram showing the circuit arrangement of the focus detecting device. An interface circuit 160 is connected to the area sensor 111, and is also connected to a microcomputer 165 as a processing device. The microcomputer 165 designates those regions in the light-receiving areas of the area sensor 111 that are used in focus detection, and controls accumulation of photocharges. The microcomputer 165 has a CPU (central processing unit) 161, ROM 162, RAM 163, and EEPROM (electrically erasable programmable ROM) 164, and executes focus detection processing in accordance with a program stored in the ROM 162. The EEPROM 164 pre-stores optical information of the focus detecting optical system in, e.g., an adjustment process or the like. A liquid crystal drive circuit 167 drives a liquid crystal display 500. Also, a microcomputer 166 controls the photographing lens mounted on the camera.

The optical effects of the above-mentioned arrangement will be explained below.

Light beams 112e, 112g, and 112f (112h) shown in FIGS. 5 and 6 travel toward the center of the frame via the stop 108 and are used in focus detection. An explanation will be given in the order these light rays travel.

Some light rays of a light beam coming from the photographing lens 401 are transmitted through the main mirror 103, and are reflected by the first reflection mirror 104 in a direction roughly agreeing with the tilt of the main mirror 103. The first reflection mirror 104 is an elliptic mirror, as described above, and can substantially set portions near the two focal points in a projection relationship. In this embodiment, one focal point is set at an optically equivalent point of a representative exit pupil position of the photographing lens 401, and the other focal point is set at an optically equivalent point of the stop 108 serving as the entrance pupil of the reimage optical system, so that the first reflection mirror serves as a field lens. In other words, the first reflection mirror 104 constitutes pupil projection means for projecting the entrance pupil of the reimage optical system onto the representative exit pupil position of the photographing lens 401.

Note that the representative exit pupil position of the photographing lens 401 is a virtual pupil position unique to a focus detecting system, which is determined in full consideration of the conditions of exit windows of various photographing lenses to be mounted on the camera.

The exit window is formed by virtual images of the front aperture 401b and rear aperture 401c of the photographing lens 401 when they are seen via the subsequent lens system. In a simple photographing lens shown in FIG. 4, the exit window is formed by the virtual image upon seeing the front aperture 401b via the photographing lens, and the rear aperture 401c itself. In a zoom lens, however, since many lenses are involved in vignetting, the front and rear apertures change in accordance with the position on the image plane on which an image is projected.

The light beam reflected by the first reflection mirror 104 is reflected again by the second reflection mirror 106, and enters the infrared ray cut filter 107. Infrared rays that impair the focus detection precision are removed by this filter 107, and only light rays in the wavelength range, from which aberrations of the photographing lens 401 have been sufficiently corrected, reach the stop 108 and reimage lens block 109 placed behind the filter 107. The light beam which is converged by the effect of the reimage lens block 109 forms a secondary object image on the area sensor 111 via the third reflection mirror 110.

Figure 9:
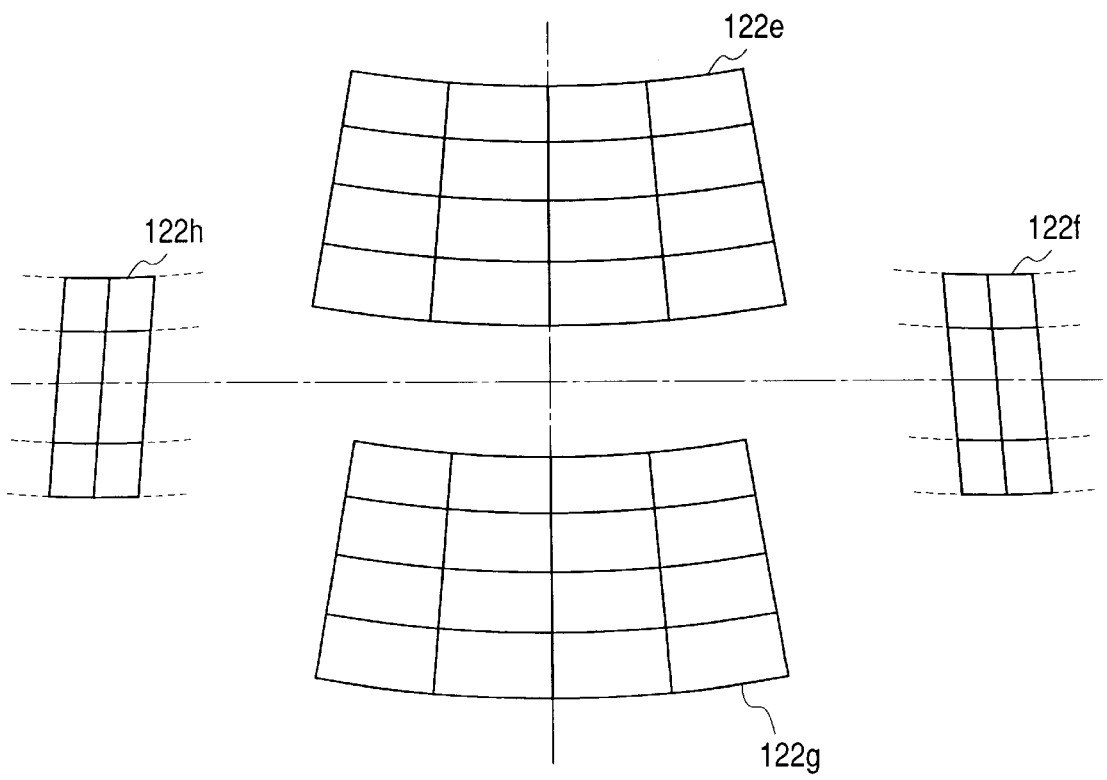

FIG. 9 shows the state of the secondary object image on the area sensor 111, and exemplifies a grid-like object. Four secondary object images 122e to 122h are formed by the four lenses of the reimage lens block 109, and pairs of images 122g and 122e, and 122f and 122h are used to detect the relative positional relationship. Note that the spacing between the aperture stops 108e and 108g of the stop 108 is different from that between the aperture stops 108f and 108h. Since the second focus detecting system with a larger spacing has more sensitive movement of a secondary object image, higher-precision focus detection can be attained.

The secondary object images 122g and 122e of the first focus detecting system have a projection range different from that of the secondary object images 122f and 122h of the second focus detecting system. That is, the projection range of the secondary object images 122g and 122e is determined by the size of the first reflection mirror 104, and that of the secondary object images 122f and 122h is determined by that region on the main mirror 103 and second reflection mirror 106, on the basis of the difference in spacing between apertures, where light rays can pass, i.e., is narrower than the range of the secondary object image 122g and 122e. Also, since the first reflection mirror 104 is obliquely set, the respective images suffer considerably large distortion as a kind of decentered distortion having no axial symmetry.

Even when such distortion is produced, the focus detecting device can satisfactorily operate as that for a camera requiring quick focusing if the following two conditions are satisfied. That is, in order to obtain an accurate in-focus determination result, (1) when the photographing lens has reached at least an in-focus position, secondary object images corresponding to an identical position on the object must be projected onto a pair of sensor arrays to be detected, i.e., the magnification difference between the two images is small in a direction perpendicular to the sensor arrays. Also, in order to obtain an accurate defocus detection result, (2) when defocus of the photographing lens has taken place, secondary object images corresponding to an identical position on the object must be projected onto a pair of sensor arrays to be detected to have a positional phase difference therebetween.

The images and sensor of the focus detecting system will be explained below in such respect.

In the first focus detecting system that splits the pupil vertically, since the tilt of the first reflection mirror 104 is in the plane of paper of FIG. 5 that agrees with the split direction of the pupil, both the secondary object images 122g and 122e shown in FIG. 9 are distorted in a fan shape symmetrical about this plane of paper, and the distortion itself is considerably large. However, the difference between the distortions of the two images is small, and the image magnification difference in the horizontal direction of FIG. 9, which corresponds to the direction perpendicular to the splitting of the pupil is nearly zero. Hence, when the light-receiving areas and sensor arrays are set, as shown in, e.g., FIG. 10, an object image to be paired with that projected onto arbitrary sensor arrays on one light-receiving area is projected onto the corresponding sensor arrays on the other light-receiving area. That is, condition (1) is met.

Figure 11:
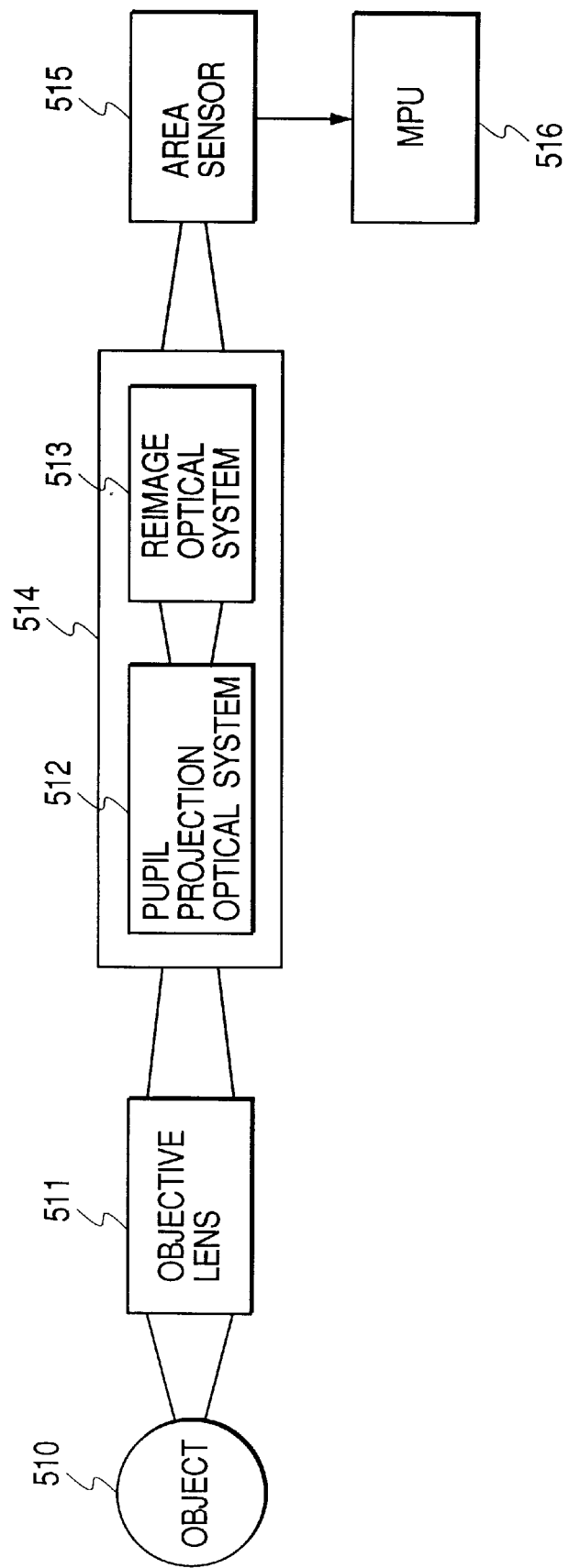
FIG. 11 is a block diagram generally showing the roles of the entire phase difference detection type focus detecting system according to the embodiment of the present invention.

FIG. 11 is a block diagram generally showing the roles of the overall phase difference detection type focus detecting system to explain the moving direction of a secondary image.

FIG. 11 illustrates an object 510, objective lens 511, focus detecting optical system 514, and area sensor 515. The focus detecting optical system 514 includes a pupil projection optical system 512 consisting of optical elements such as a field lens, field mirror, and the like, and a reimage optical system 513 arranged by a pair of image lenses. An MPU (microprocessing unit) 516 processes the output from the area sensor.

Causes of the distortions of secondary object images projected onto the area sensor 515 stem from the pupil projection optical system 512 and reimage optical system 513. More specifically, the specific natures of curvatures are obtained by respectively ray tracing these optical systems.

If the distortion of the secondary image is caused by the reimage optical system, assuming movement of the secondary image upon defocus of the photographing lens on the primary image plane, an object image which accurately moves in the line-up direction of the aperture stops of the reimage optical system on the primary image plane is distorted by the reimage optical system and projected onto the area sensor. Hence, this indicates the secondary image moves along the distortion. By contrast, if the distortion of the secondary image is caused by the pupil projection optical system, a distorted image is present on the primary image plane, and is projected by the reimage optical system onto the area sensor without any distortion. Hence, the moving direction of the secondary image upon defocus of the photographing lens agrees with the line-up direction of the aperture stops of the reimage optical system.

Referring back to FIG. 9, major factors of distortion produced by this focus detecting optical system will be examined.

From a simple optical examination, the grid reversely projected onto the area sensor via the reimage optical system alone suffers less distortion. That is, the cause of the distortion of the secondary object image is the first reflection mirror 104, i.e., the pupil projection optical system, and the distortion produced on the paraxial image plane 105 of the first reflection mirror 104 is directly projected onto the area sensor 111 by the reimage lens block 109. Therefore, the moving direction of the secondary object image agrees with the line-up direction of the aperture stops 108e and 108g, and agrees with the directions of arrows shown in FIG. 12 on the area sensor if changes accredited to those in image magnification are removed.

By setting the sensor arrays as described above, condition (2) can be met at the same time. As a consequence, by comparing the relative positional relationship between secondary object images, the defocus amount of the photographing lens can be obtained.

Especially, when the teleconversion lens is attached to the photographing lens, defocus larger than that produced by the master lens alone is often produced. However, by meeting condition (2), focus adjustment can be done without posing any problem.

Figure 13:
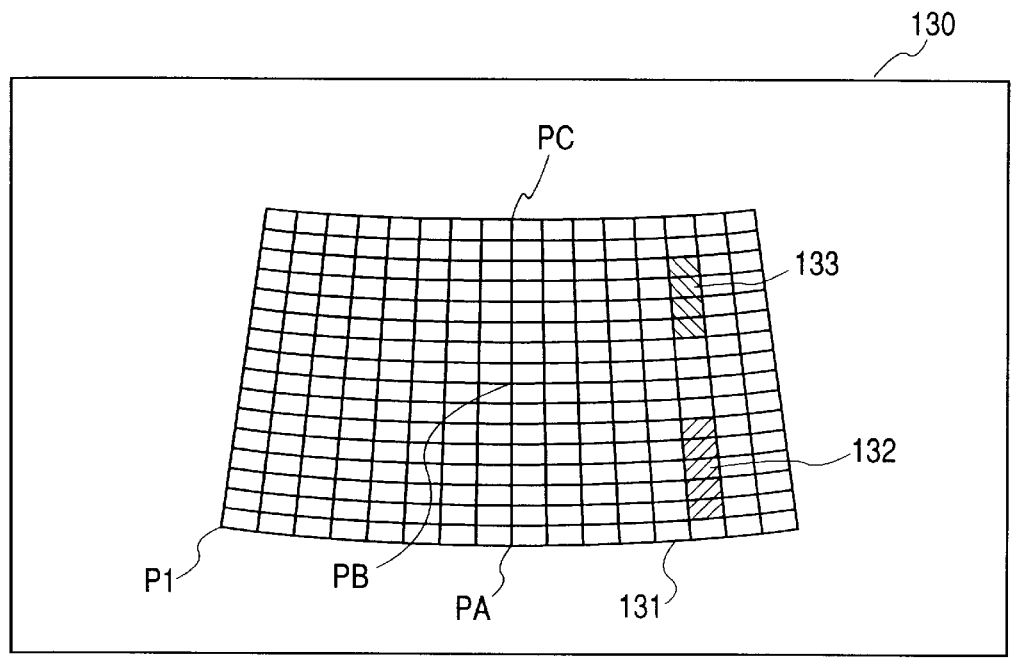
FIG. 13 is a view showing a focus detecting region on an image plane in the embodiment of the present invention.
Figure 14:
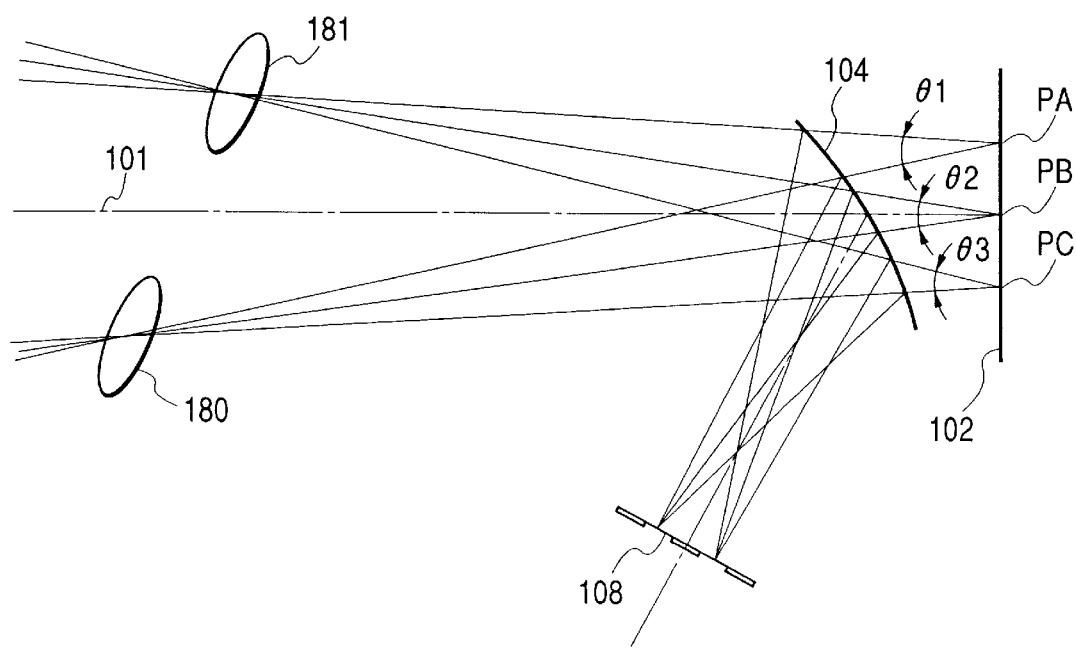
FIG. 14 is a view for explaining the optical path of a first focus detecting system in the embodiment of the present invention.

FIG. 13 shows a focus detecting region on the image plane by the light-receiving areas with such layout. In order to photoelectrically convert a distorted secondary object image by the light-receiving areas 111g and 111e (see FIG. 10) lined up in a rectangular pattern, a focus detecting region 131 has a distorted shape, as shown in FIG. 13, in an image plane 130. Since the first reflection mirror 104 is obliquely set with respect to the optical axis 101 of the photographing lens, the distance between the stop 108 and first reflection mirror 104 varies depending on the position on the focus detecting area. As described above, the first reflection mirror 104 has a function of a field lens, and upon projecting the stop 108 onto the photographing lens side, its images 180 and 181 are obliquely formed due to the aforementioned distance difference, as shown in FIG. 14. In other words, when points PA, PB, and PC are defined on the image plane 102, as shown in FIG. 14, angles Δ1, Δ2, and Δ3 that look into the centers of gravity of the stop images 180 and 181 from these points satisfy:

$$\Delta 1 < \Delta 2 < \Delta 3$$

More specifically, parallaxes Δ1, Δ2, and Δ3 produced upon splitting the pupil of the photographing lens into two areas vary depending on the position on the focus detecting area, and the velocity when the two images approach each other or are separated away from each other when defocus of the photographing lens is not uniform.

Figure 10:
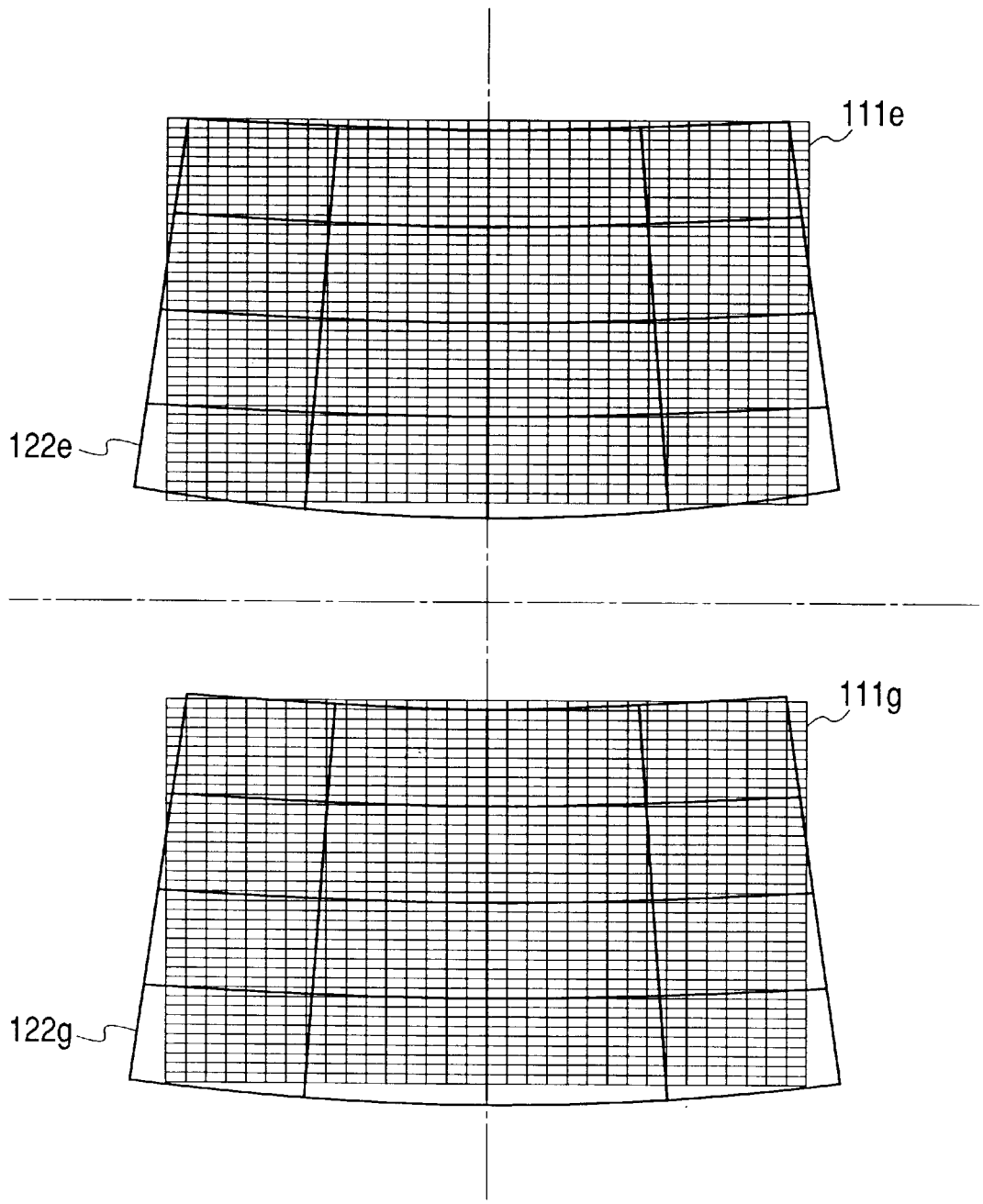

Strictly speaking, the curvatures of the two images are not the same, and in the vertical direction of FIG. 10, i.e., in the direction of the sensor arrays, the secondary object image 122g is projected to have a larger size than the secondary object image 122e.

When the two images have different sizes and low similarity therebetween, the detected image spacing has no significance and cannot be used in in-focus detection. In order to validate focus detection, the image curvatures and image deviation sensitivity are corrected by arithmetic processing, the sizes of the two images are adjusted based on the corrected image signals, and a uniform image moving velocity is set. More specifically, this arithmetic processing amounts to converting the image signals so that virtual sampling points of the two images on the primary image plane are set at an identical point, and the pitch of the virtual sampling points changes in correspondence with the distribution of the image deviation sensitivity.

When the above-mentioned focus detecting region is divided to set a plurality of vertical focus detecting areas so as to obtain a plurality of pieces of focus information, the photographing lens can be automatically focused on the most optimal position of a principal object on the basis of the defocus map on the image plane.

The second focus detecting system for splitting the pupil horizontally will be explained below.

In the second focus detecting system, the image magnification difference between the two images decreases in a direction perpendicular to the pupil splitting direction in only a region close to the center of the image plane. For this reason, when light-receiving areas are set on this region alone, an object image to be paired with that projected onto arbitrary sensor arrays on one light-receiving area is projected onto the corresponding sensor arrays on the other light-receiving area, thus meeting condition (1) above.

Figure 15:
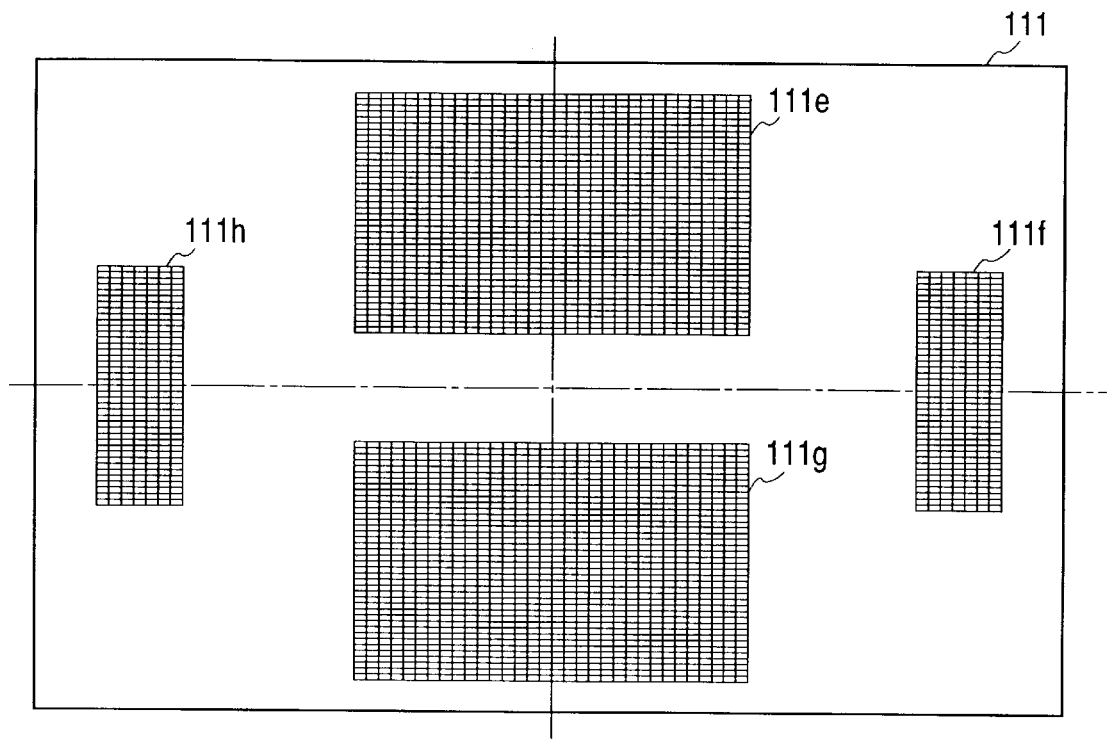
Figure 16:
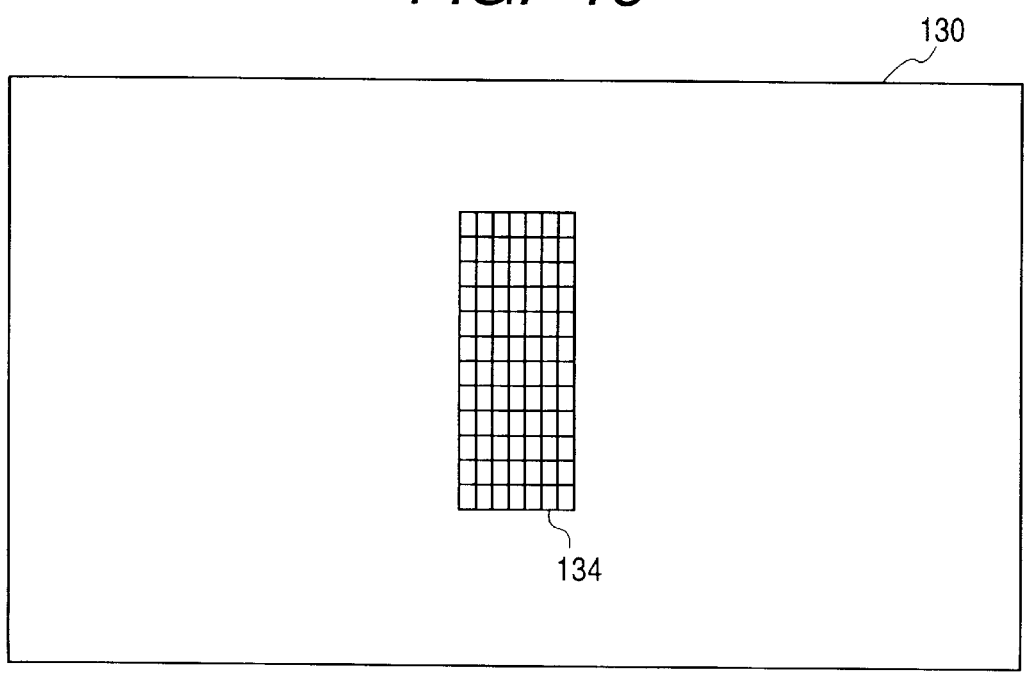
FIG. 16 is a view partially showing the focus detecting region on the image plane in the embodiment of the present invention.

FIG. 15 is a plan view of the area sensor, which illustrates light-receiving areas 111f and 111h for the second focus detecting system in addition to the light-receiving areas 111g and 111e for the first focus detecting system shown in FIG. 10. The moving direction of the pair of secondary object images 122f and 122h agrees with the line-up direction of the aperture stops 108f and 108h for the same reason as that for the first focus detecting system, and by setting the sensor arrays, as shown in FIG. 15, condition (2) can also already be met. A focus detecting region on the image plane formed by such light-receiving areas is as shown in FIG. 16, i.e., a focus detecting region 134 is located at the center in the image plane 130 and includes a plurality of horizontal focus detecting areas.

Division of the focus detecting region and layout of the focus detecting areas will be explained in detail below.

Figure 17:
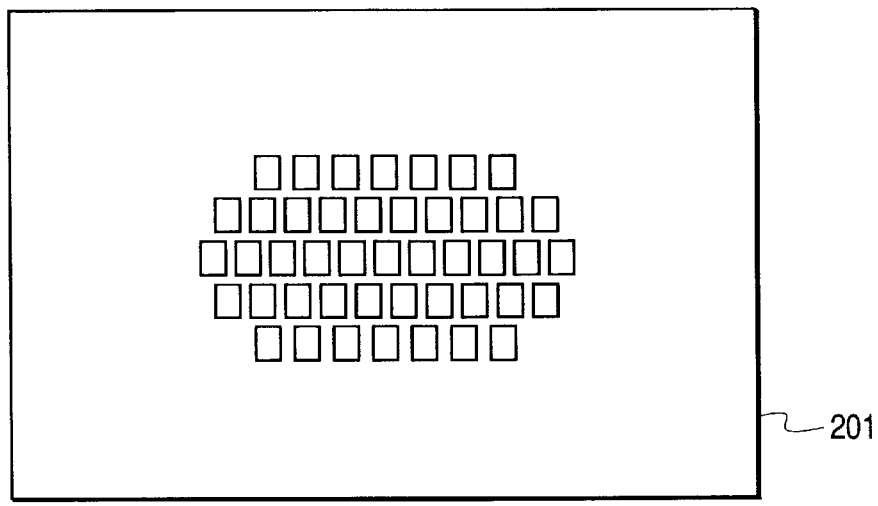
FIG. 17 is a view showing the distribution of focus detecting areas viewed via the camera finder in the embodiment of the present invention.
Figure 18:
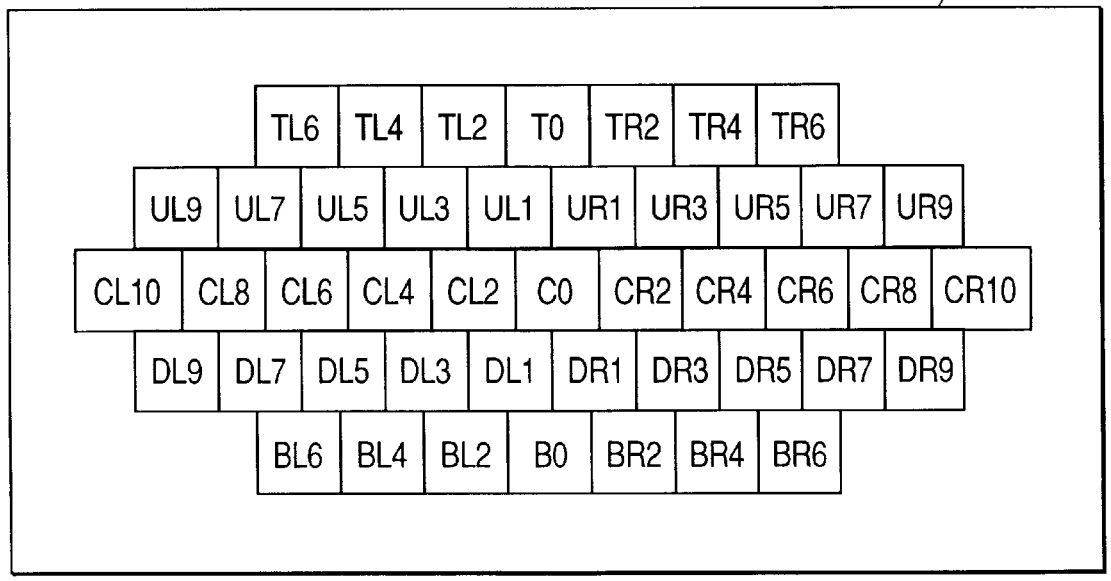
FIG. 18 is a view showing the names of focus detecting areas in the embodiment of the present invention.

FIG. 17 shows the distribution of the focus detecting areas viewed from the camera finder. FIG. 18 shows the names of the focus detecting areas used in the following description.

Rectangular indicators that represent a total of 45 focus detecting areas set in a checkerboard pattern are formed at the central portion of a photographing frame 201, and the respective rows include 7, 10, 11, 10, and 7 focus detecting areas. The first focus detecting system uses all the 45 focus detecting areas, while the second focus detecting system uses focus detecting areas T0, UL1, UR1, C0, DL1, DR1, and B0.

Such layout of the focus detecting areas is visually preferable, and is convenient for selecting arbitrary focus detecting areas since such selection can be attained by movements in only the up, down, right, and left directions. Note that the focus detection areas T0, UL1, UR1, C0, DL1, DR1, and B0 are subjected to focus detection by both the first and second focus detecting systems. Hence, these areas can have high sensitivity in both the vertical and horizontal luminance distributions on the object.

Due to the presence of the fan-shaped distortions of the secondary object images, as described earlier, the first focus detecting system having a broader focus detecting region requires an elaborate plan to line up the focus detecting areas. The second focus detecting system can form the focus detecting areas T0, C0, and B0 by considering the area sensor as a set of line sensors, and dividing these line sensors into five continuous grooves and using the central, upper, and lower ones of these groups. Furthermore, when the remaining groups are respectively divided into two areas in the line direction, the focus detecting areas UL1, UR1, DL1, and DR1 can be easily obtained. The division method of the focus detecting region of the first focus detecting system will be described in detail below.

Figure 19:
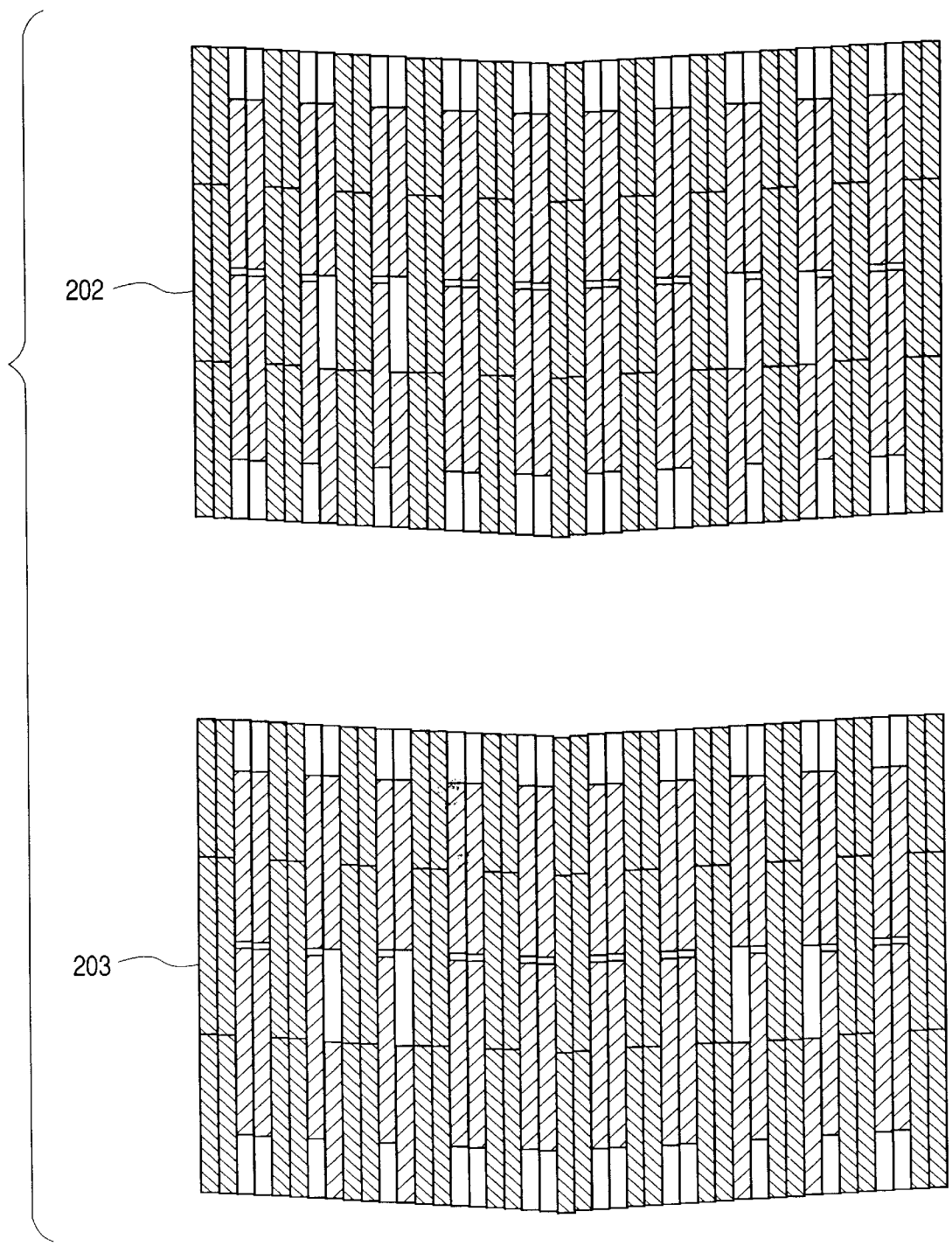
FIG. 19 is a view showing the light-receiving areas of the first focus detecting system in the embodiment of the present invention.

FIG. 19 shows the light-receiving areas of the first focus detecting system.

Light-receiving areas 202 and 203 combine three different types A, B, and C of sensor arrays shown in FIG. 20. Each sensor array has fixed pixel regions each consisting of a plurality of neighboring pixels, the accumulation time of which is simultaneously controlled by a focus detecting circuit. In FIG. 19, such pixel regions are indicated by hatching. The sensor array of type A is assigned a three-pixel region, and each of the sensor arrays of types B and C is assigned a two-pixel region. The accumulation times in units of pixel regions are independently controlled in correspondence with the intensity of light that hits these pixel regions via the focus detecting optical system, and image signals having appropriate levels can be obtained.

Figure 21:
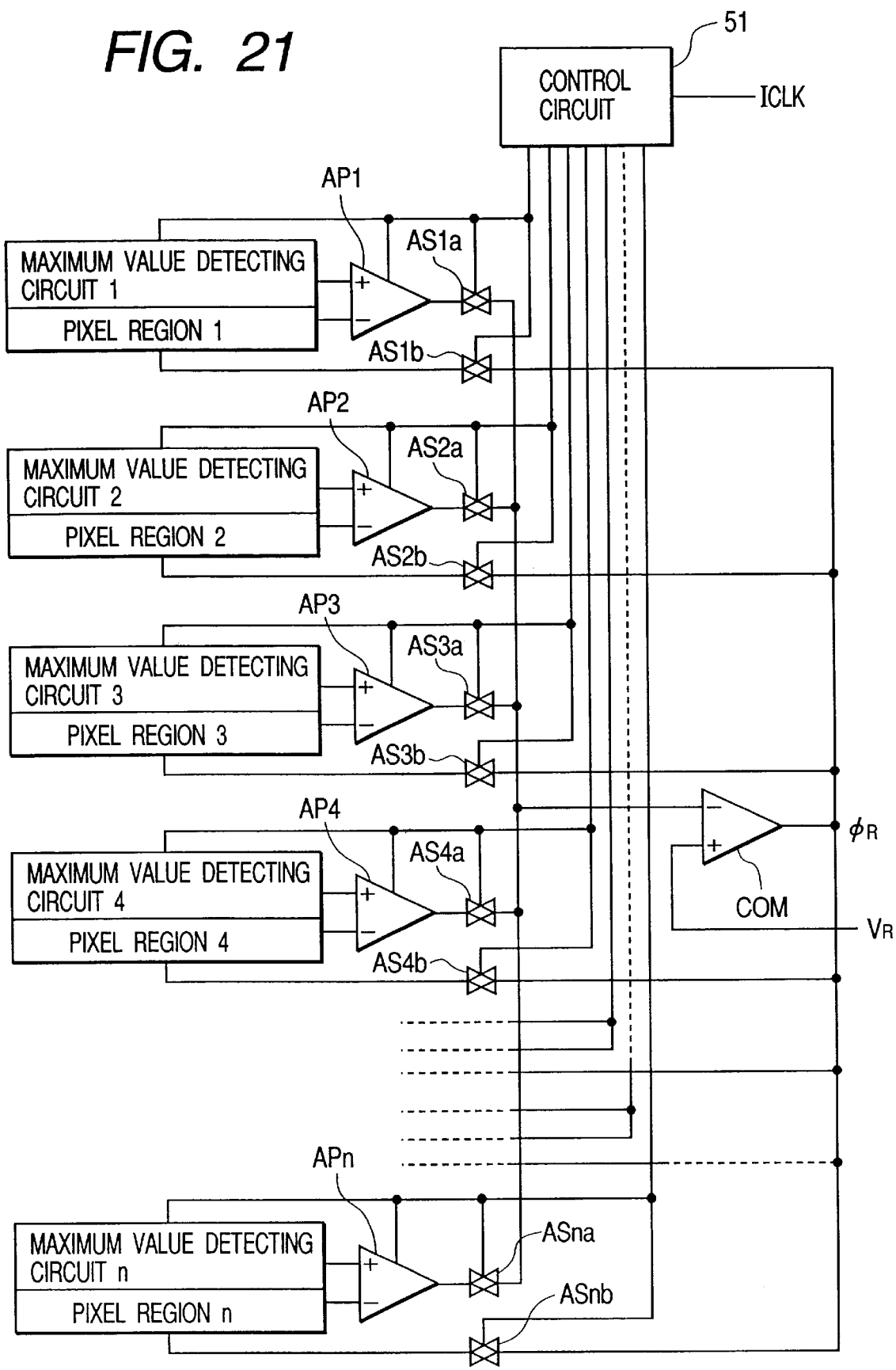
FIG. 21 is a circuit diagram showing a principal part of an area sensor accumulation control circuit in the embodiment of the present invention.

FIG. 21 shows a principal part of an area sensor accumulation control circuit.

A maximum value detecting circuit and differential amplifier are connected to each pair of pixel regions, and accumulation is done until the output from each differential amplifier reaches a common predetermined level $V_R$. When the output from the differential amplifier has reached the level $V_R$, the accumulation ends, and a read signal $\phi_R$ is output from each pixel region.

In order to reduce the circuit scale, a control circuit 51 sequentially scans analog switches AS1a and AS1b to ASna and ASnb (n is the number of pixel regions per light-receiving area) provided in units of pixel regions on the basis of a reference clock signal ICLK, and determines the end of accumulation of all the regions using a common comparator COM.

Figure 22:
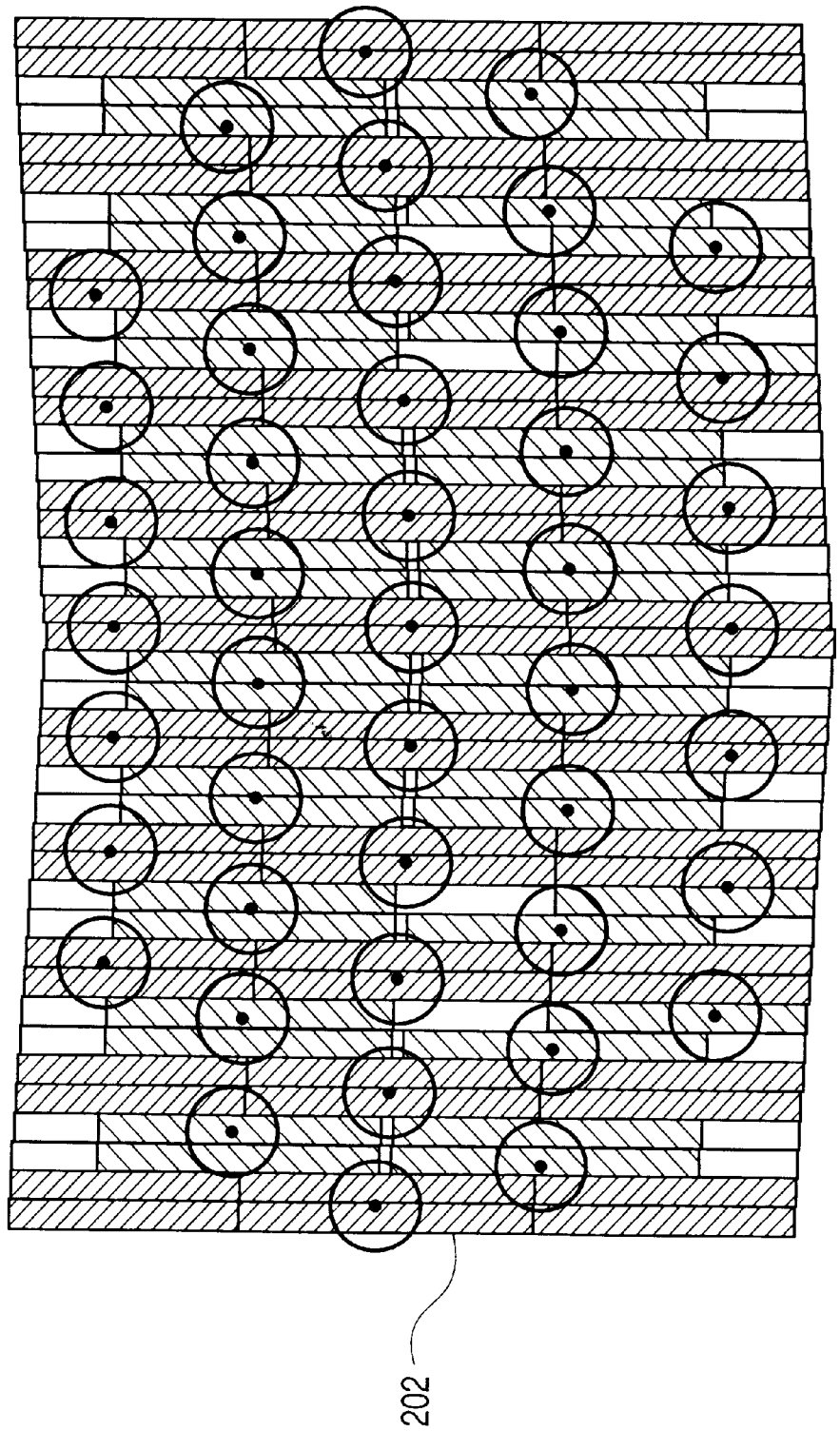
FIG. 22 is a view showing the centers of focus detecting areas projected onto the light-receiving area in the embodiment of the present invention.

FIG. 22 shows the centers of the 45 focus detecting areas shown in FIG. 17 projected onto the light-receiving area 202. Note that projection onto the light-receiving area 203 is equivalent to that onto the light-receiving area 202 since the distortion states on these areas are roughly equal to each other. In FIG. 22, the center of each circle indicates the projected position of the center of each focus detecting area, and the focus detecting areas which are lined up in a checkerboard pattern line up along arcs due to the curvature of an image produced by the first reflection mirror 104.

As has been described previously using FIG. 11, the moving direction of an object image upon defocus of the photographing lens agrees with the directions of arrows in FIG. 12 if changes accredited to those in image magnification are removed. For this reason, it is inappropriate to set the sensor arrays in accordance with the curvature of an image.

In general, since neighboring pixels of an area sensor require a space for interconnects, a relatively large insensitive zone is formed. For this reason, it is harder for an area sensor to reflect the image movement in the sensor output than a linear sensor, and the focus detection precision often declines when the area sensor is used in focus detection. In the area sensor shown in FIG. 22, two juxtaposed pixel regions having a phase difference of a ½ pixel or equivalent with respect to a distorted image are prepared for each of nearly all the focus detecting areas, and the average value of the focus detection results of these pixel regions is output. In this case, phase detection errors of an image are canceled in the final focus detection result, and detection precision is expected to improve especially in an object pattern including many high-frequency components.

FIG. 23 shows the types of sensor arrays that form the respective focus detecting areas.

When a plurality of different types of sensor arrays are used, and the types of sensor arrays to be used are changed like A/C, A/A, and A/A as in a column of focus detecting areas TL6, CL6, and BL6, a checkerboard-like focus detecting area layout can be attained while allowing fan-shaped distortion of an image.

As described above, the TTL phase difference detection type focus detecting device suffers a considerable drop in focus detection precision when some light components in a focus detecting light beam are eclipsed. For this reason, the photographing lens to be mounted must have a pupil size that does not eclipse any light components for each focus detecting area.

The focus detecting areas of the first focus detecting system for splitting the pupil vertically and the second focus detecting system for splitting the pupil horizontally will be explained in terms of their vulnerability to eclipse.

All the focus detecting areas of the first focus detecting system use secondary object images formed by light beams that have passed through the convex lenses 109e and 109g of the reimage lens block 109. FIG. 14 above is a view for explaining the optical path of the first focus detecting system. That is, FIG. 14 illustrates light rays that pass through the centers of gravity of the aperture stops 109e and 109g placed in front of the convex lenses 108e and 108g, of light beams that reach the end portions of the focus detecting areas of the first focus detecting system, the main mirror 103 and second reflection mirror 106 are not shown for the sake of simplicity, and the optical path is partially developed.

Tracing the focus detecting light beam backward from the stop 108 toward the photographing lens side, i.e., in a direction opposite to its traveling direction, the focus detecting light beam coming from each focus detecting area temporarily converges to a position near the focal point of the first reflection mirror 104 as an elliptic mirror, and then diverges more from the optical axis as the light beam comes from a focus detecting area farther from the central one.

Since this focal point position is the representative exit pupil position of the photographing lens, the focus detecting light beam is hardly eclipsed in many photographing lenses. However, in general, in case of a photographing lens for a camera, the presence/absence of eclipse is determined by the position and size of the exit window due to vignetting on the outer peripheral portion of the frame. Hence, eclipse may be produced depending on the combination of the photographing lens and focus detecting area. In this case, in a photographing lens which has a small exit window separated from the representative exit pupil position, as the focus detecting area is separated farther from the optical axis, eclipse is produced more easily. By contrast, the focus detecting area on the optical axis most hardly eclipses light.

The first focus detecting system is set so that the above-mentioned 45 focus detecting areas are free from any eclipse of light beams with respect to all the states of photographing lenses having a full F number of 5.6 or less, which may be used in this camera system.

The relationship between the first focus detecting system and attachment of the teleconversion lens mentioned above will be examined. A photographing lens having a focal length=300 mm/a full F number=4 is used as the master lens, and an optical system for doubling the focal length of the master lens is used as the teleconversion lens.

Figure 24:
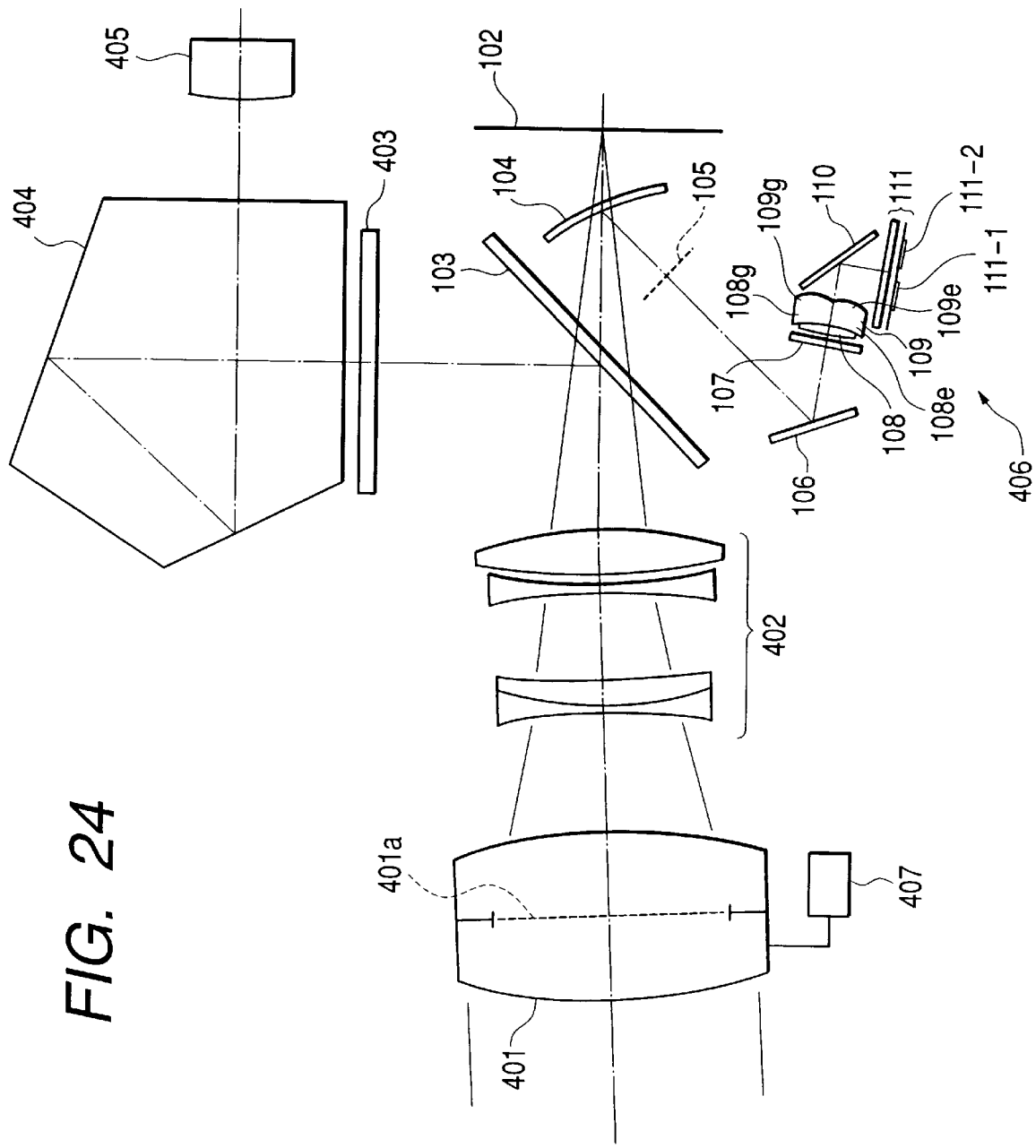
FIG. 24 shows the layout of an optical system in a state wherein a teleconversion lens is inserted between the camera main body and photographing lens in the embodiment of the present invention.

FIG. 24 shows the state wherein the teleconversion lens is inserted between the camera body and photographing lens.

Referring to FIG. 24, a teleconversion lens 402 is mechanically and electrically connected between a camera body 406 and a photographing lens 401 via a lens mount (not shown). The teleconversion lens 402 forms a concave lens as a whole, and a photographing lens system combining the master lens and teleconversion lens has a focal length=600 mm/a full F number=8, which exceeds F5.6. The exit window is smaller than that of the master lens, and is distant from the film surface.

In this state, eclipse of focus detecting light beams is checked. For example, at infinity, the focus detecting areas UL1, UR1, CL2, C0, CR2, DL1, and DR1 shown in FIG. 18 are free from any eclipse, and other focus detecting areas separated from the optical axis eclipse light. For this reason, it is impossible to attain high-precision focus detection.

Figure 25:
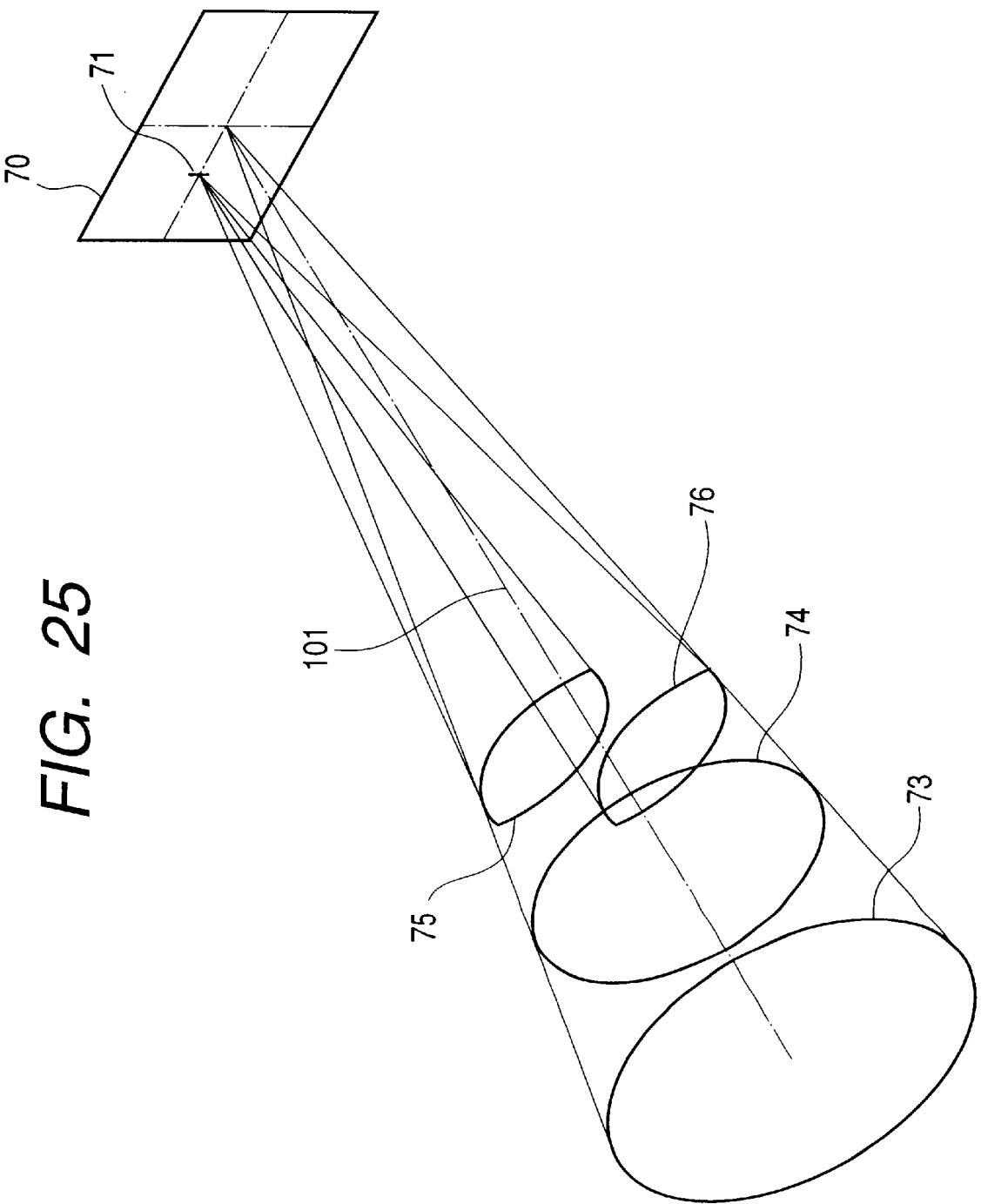
FIG. 25 is a view for explaining incoming light beams on focus detecting areas that eclipse a focus detecting light beam in the embodiment of the present invention.

FIG. 25 is an explanatory view of a light beam which enters a focus detecting area CL8 that eclipses the focus detecting light beam.

FIG. 25 illustrates the optical axis 101 of the photographing lens, an image plane 70 as a photographing film, that position 71 on the image plane, which corresponds to the focus detecting area CL8, exit windows 73 and 74 of the photographing lens system (600 mm/F8) with respect to the position 71, and projected images 75 and 76 of the aperture stops 108e and 108g by the first reflection mirror 104.

If all curved surfaces that connect the focus detecting area position 71 and the outer perimeters of the projected images 75 and 76 of the aperture stops pass inside the exit windows 73 and 74, the focus detecting light beam is free from any eclipse.

However, in FIG. 25, when the focus detecting light beam obliquely crosses the exit window 73, the curved surfaces cross the exit window 73, and some light beam components are eclipsed there.

The second focus detecting system will be explained below.

All the focus detecting areas of the second focus detecting system use secondary object images formed by light beams which have passed through the convex lenses 109f and 109h of the reimage lens block 109. As in the first focus detecting system, the focus detecting light beam coming from each focus detecting area temporarily converges to a position near the focal point of the first reflection mirror 104 as an elliptic mirror, and then diverges more from the optical axis as the light beam comes from a focus detecting area farther from the central one. Hence, in the second focus detecting system as well, in a photographing lens which has a small exit window separated from the representative exit pupil position, as the focus detecting area is separated farther from the optical axis, eclipse is produced more easily. By contrast, the focus detecting area on the optical axis most hardly eclipses light.

The second focus detecting system is set so that the above-mentioned seven focus detecting areas are free from any eclipse of light beams with respect to all the states of photographing lenses having a full F number of 2.8 or less, which may be used in this camera system.

The relationship between the second focus detecting system and the above-mentioned photographing lens (focal length=300 mm/full F number=4) will be examined below.

Upon examination of eclipse of the focus detecting light beams at, e.g., infinity, the focus detecting areas UL1, UR1, C0, DL1, and DR1 shown in FIG. 18 are free from any eclipse, but the focus detecting areas T0 and B0 eclipse light. For this reason, it is impossible to attain high-precision focus detection. Furthermore, when the above-mentioned teleconversion lens is attached, since all the focus detecting areas eclipse light, it is impossible to attain high-precision focus detection.

FIG. 26A summarizes focus detecting areas free from eclipse of focus detecting light beams when the range ring position is infinity in the first and second focus detecting systems in case of such photographing lens system.

FIG. 26A shows the results obtained when the range ring position is infinity. However, upon focusing on an object at a nearer distance position, the number of focus detecting areas free from eclipse decreases since the state of the exit window changes. That is, when conditions are fixed (e.g., a master lens of 300 mm/F2.8 and a teleconversion lens effecting the focal length twice is used and the range ring position is fixed), the number of focus detecting areas free from eclipse can be uniquely determined. However, in an actual use state in which the range ring position or the zooming position of a zoom lens changes, the number of focus detecting areas free from eclipse always varies. Hence, the focus detecting areas free from eclipse are classified in accordance with the full F numbers, as shown in FIG. 26B.

More specifically, when the full F number is larger than F5.6 in the first focus detecting system, the number of focus detecting areas free from eclipse changes in accordance with the state of the exit window. On the other hand, when the full F number is larger than F2.8 in the second focus detecting system, the number of focus detecting areas free from eclipse changes in accordance with the state of the exit window. The state of the exit window can be obtained by, e.g., ray tracing using optical data of the photographing lens, but is not fixed in units of photographing lenses since the state changes depending on the ring range position or zooming position of the photographing lens. Therefore, when focus detection is permitted for all the focus detecting areas free from eclipse, some focus detecting areas which were used immediately before extension of the range ring or zooming may be suddenly inhibited from being used.

To avoid such a problem, in this embodiment, in a photographing lens system with a full F number larger than F5.6, focus detection by the central focus detecting area C0 of the first focus detecting system is permitted independent of the state of the photographing lens system, if it is free from eclipse of a light beam. Even if focus detecting areas other than the central areas are free from eclipse and can be used in focus detection, their focus detection is inhibited. On the other hand, in a photographing lens system with a full F number larger than F2.8, focus detection by the central focus detecting area C0 of the second focus detecting system is permitted independent of the state of the photographing lens system, if it is free from eclipse of a light beam. Even if focus detecting areas other than the central areas are free from eclipse and can be used in focus detection, their focus detection is basically inhibited.

With this control, the photographer can very easily understand which of the focus detecting areas are currently available, with the help of a display shown in FIG. 3 (to be described later). Also, since focus detecting areas which cannot guarantee high focus detection precision if they operate are known in advance, unnecessary focus detecting operations can be avoided, resulting in high-speed focus adjustment.

FIG. 27 summarizes such operations of the camera. Also, FIG. 27 has entries about display modes (which will be explained in detail later with reference to FIGS. 3A to 3D) used for informing the photographer of changes in the number of active focus detecting areas. Different display modes are prepared depending on whether the focus detecting area selection method is an arbitrary selection mode or automatic selection mode.

FIGS. 3A to 3D show external displays on the camera.

Figure 3A:
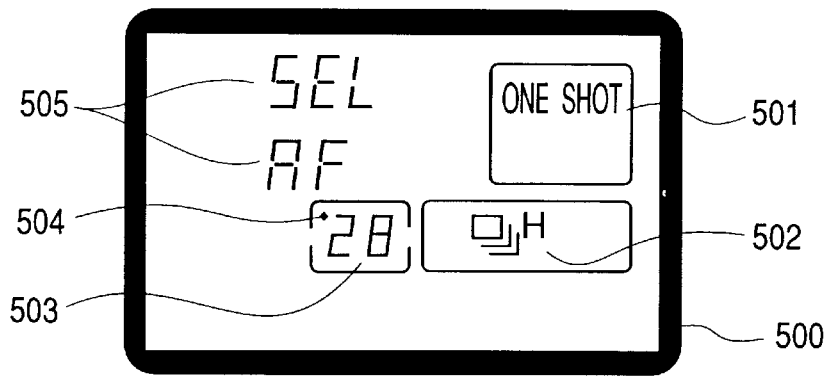
FIGS. 3A, 3B, 3C and 3D are views for explaining an external display of a camera in the embodiment of the present invention.
Figure 3B:
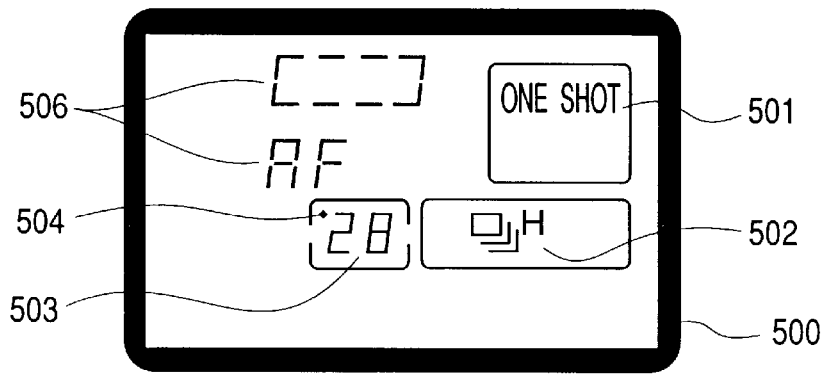
Figure 3C:
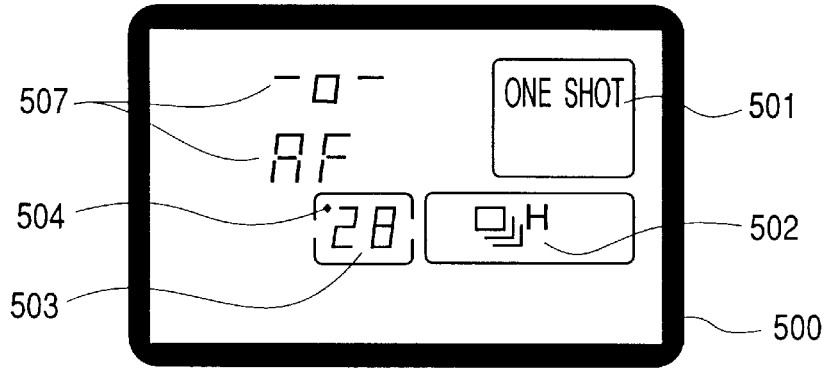
Figure 3D:
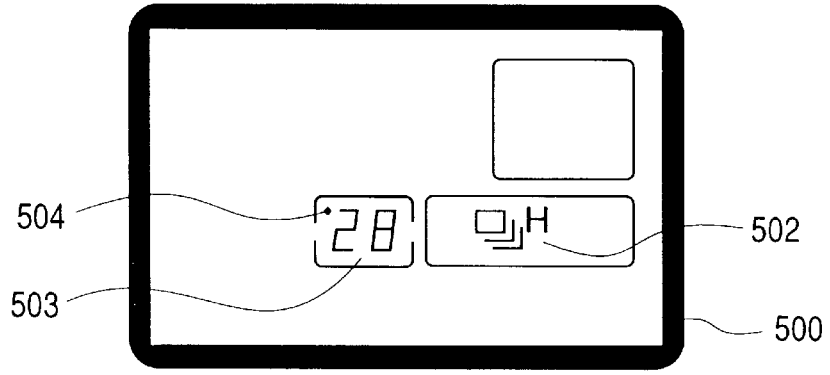

FIGS. 3A to 3D illustrate a liquid crystal display 500, a mark 501 indicating focus adjustment in a one-shot mode, a mark 502 indicating a high-speed continuous shot mode, a photographed frame counter 503, a mark 504 indicating that the photographed frame counter 503 counts down, a mark 505 indicating that the focus detecting area selection mode is set in the arbitrary selection mode, a mark 506 indicating that the focus detecting area selection mode is set in the automatic selection mode, and a mark 507 indicating a mode in which only the central focus detecting area of the first focus detecting system can be used in focus detection. When focus detection by all the focus detecting areas is inhibited, no indications pertaining to focus adjustment are made, as shown in FIG. 3D.

Photographing lens systems having full F numbers larger than F5.6 often include a system in which a teleconversion lens is attached to an ultra-telephoto lens. In general, such a photographing lens system often has large initial defocus of an object. In this case, it is often hard to detect the defocus amount in the first focus detection. That is, in such case, focus detection repeats itself while search-driving the photographing lens to the infinity end and nearest distance end, and upon successful detection of defocus, the driving mode is switched to high-speed driving to a predetermined position. Hence, if the focus detecting cycle can be shortened, since a high search-driving speed of the photographing lens can be set, the time required until an in-focus state is reached can be shortened. By limiting focus detecting operation to only the central focus detecting area, the focus detecting cycle can be shortened, and quick focus adjustment can be attained even when a teleconversion lens is attached to an ultra-telephoto lens.

Figure 1:
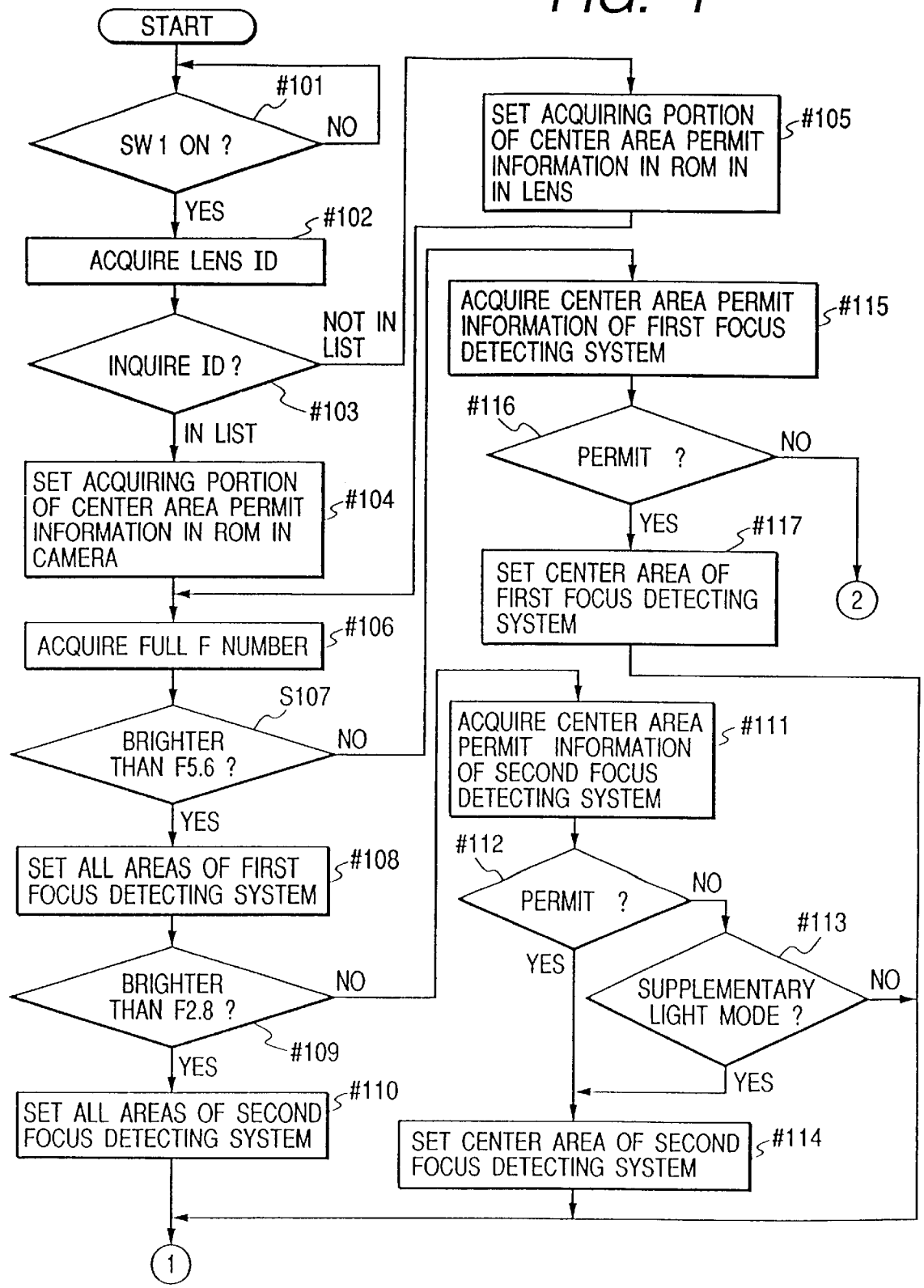
FIG. 1 is a flow chart showing some steps of a series of operations of a camera system according to an embodiment of the present invention.
Figure 2:
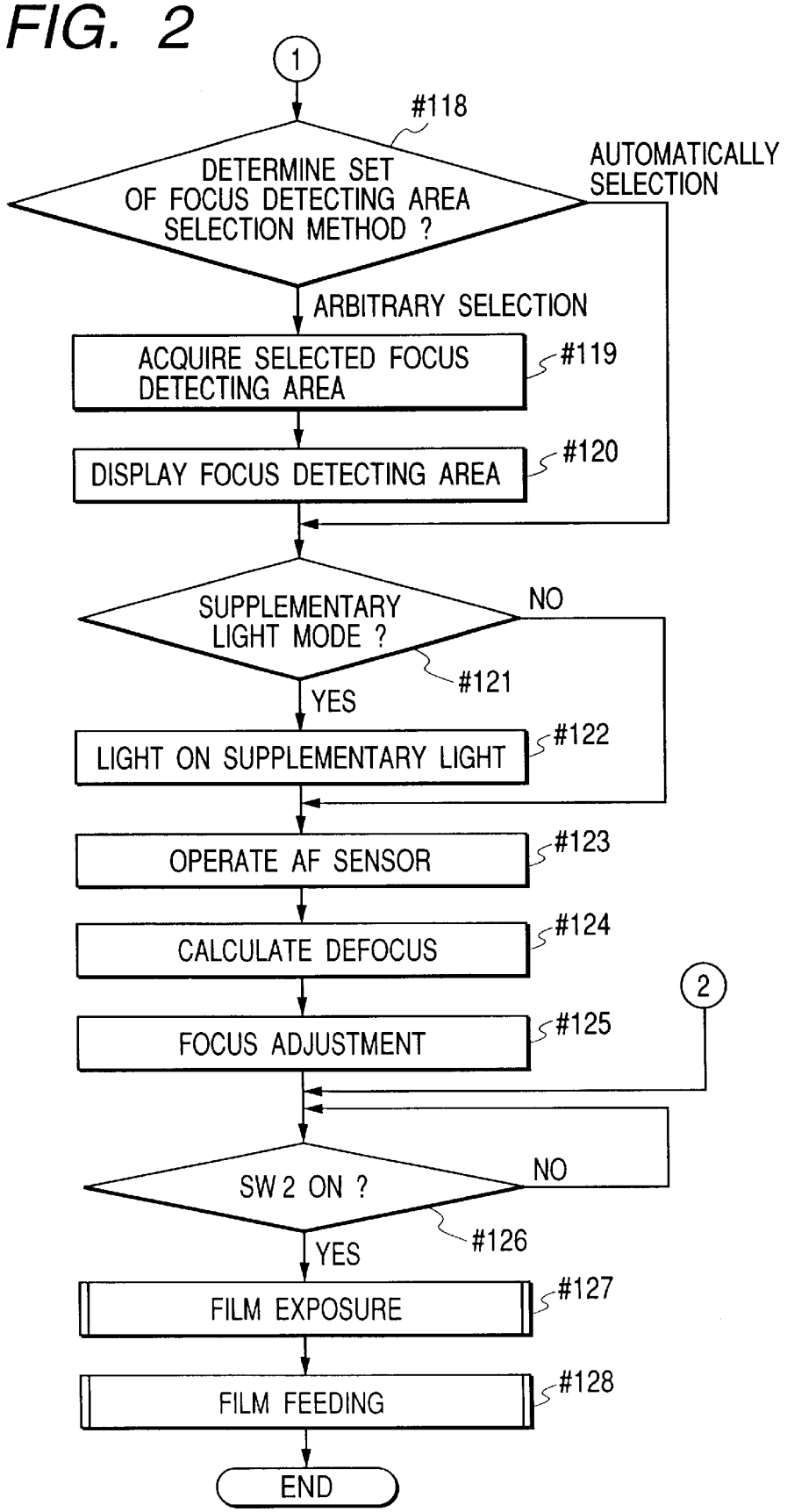
FIG. 2 is a flow chart showing the operation continued from FIG. 1.

FIGS. 1 and 2 are flow charts of a program associated with focus detection and the like stored in the ROM 162 shown in FIG. 8.

The microcomputer 165 checks the state of a switch SW1 interlocked with a release button in step #101. If the release button has been pressed to its half stroke position and the switch SW1 is ON, the flow advances to step #102; otherwise, step #101 repeats itself. In step #102, the microcomputer 165 communicates with the microcomputer 166 of the mounted photographing lens to acquire lens ID information having a unique value (see FIG. 27) in units of types of photographing lenses. Subsequently, the microcomputer 165 checks in step #103 if the acquired lens ID information is included in an ID list stored on the ROM 162. If the acquired lens ID information is included in the list, the flow advances to step #104; otherwise, the flow advances to step #105.

Note that the ROM 162 in the camera stores center area permit information, indicating whether or not the central focus detecting area is set, for each lens having lens ID information included in the ID list in correspondence with the lens ID information.

In step #104, the microcomputer 165 sets the source of the information indicating whether or not focus detection by the central one of the 45 focus detecting areas, i.e., the focus detecting area C0 in FIG. 18 is permitted, as the ROM 162 in the camera.

In step #105, the microcomputer 165 sets the ROM in the photographing lens as the source of the information indicating whether or not focus detection by the focus detecting area C0 is permitted. More specifically, if it is determined in step #103 that the lens ID information of the mounted photographing lens is not included in the ID list, the ROM 162 in the camera does not store any center area permit information of that lens. In such case, center area permit information is stored on the ROM in the lens, and is read out from the ROM in the lens in step #105, thus coping with the aforementioned case. Note that the source of information in step #104 or #105 is not limited to a ROM but may be an EEPROM or flash memory.

In step #106, the microcomputer 165 communicates with the photographing lens to acquire the full F number. The microcomputer 165 then checks in step #107 if the acquired full F number value is equal to or smaller than F5.6, i.e., is brighter than F5.6. If the full F number value is equal to or smaller than F5.6, the flow advances to step #108 to set all the 45 focus detecting areas of the first focus detecting system as active areas. The microcomputer 165 checks in step #109 if the full F number value is equal to or smaller than F2.8. If the full F number value is equal to or smaller than F2.8, the flow advances to step #110 to set all the seven focus detecting areas of the second focus detecting system as active areas. On the other hand, if the full F number value is not smaller than F2.8, the flow advances from step #109 to step #111 to acquire the permit information concerning the central focus detecting area C0 of the second focus detecting system from the information source set in step #104 or #105 above.

For a lens having a full F number not larger than F4, the ROM read in step #104 or #105 stores the center area permit information of the second focus detecting system.

The microcomputer 165 checks the permit information for the central focus detecting area C0 of the second focus detecting system in step #112. If focus detection by the area C0 is permitted, the flow advances to step #114 to set the central focus detecting area C0 of the second focus detecting system as an active area. On the other hand, if focus detection by the area C0 is not permitted, the flow advances to step #113 to check if a supplementary light mode is selected, i.e., if the object luminance is low and a supplementary light emitting device operates to help focus detection. If the supplementary light mode is selected, the flow advances to step #114 above to set the central focus detecting area C0 of the second focus detecting system as an active area; otherwise, the flow advances to step #118 in FIG. 2.

The supplementary light emitting device is integrally equipped in a speed light or the like as a camera accessory, and enters an operative mode upon completion of charging of a flash device capacitor.

This device projects a large number of line patterns perpendicular to the focus detecting area to improve focus detection precision. To cope with the conventionally popular central horizontal focus detecting area, these line patterns are vertical stripes. Since a focus detecting system having high sensitivity to vertical stripes is the second focus detecting system, the central focus detecting area C0 of the second focus detecting system is set as an active area in the supplementary light mode. In this case, the focus detecting light beam is eclipsed. However, since patterns advantageous to the second focus detecting system are projected, any drop in detection precision is negligibly small.

If it is determined in step #107 that the full F number value is larger than F5.6, the flow advances to step #115 to acquire the permit information for the central focus detecting area C0 of the second focus detecting system from the source set in step #104 or #105 above. Different kinds of permit information are output in accordance with the master lens alone and a combination of the master lens and teleconversion lens. That is, the ROM stores information corresponding to FIG. 27 for the master lens alone, and that for the combination of the master lens and a teleconversion lens. This kind of information corresponds to "operation permit information in units of photographing optical systems" in the present invention. As the center area permit information stored in the ROM, information for permitting focus detection by the central focus detecting area of the first focus detecting system is stored in the case of lenses having full F numbers not larger than F8.

Note that the full F number checked in step #107 and the like indicates the total full F number of a photographing optical system as a combination of the master lens and teleconversion lens when the teleconversion lens is added to the master lens.

In step #116, the microcomputer 165 checks the permit information concerning the central focus detecting area C0 of the first focus detecting system. If focus detection by the central focus detecting area C0 of the first focus detecting system is permitted, the flow advances to step #117 to set the central focus detecting area C0 of the first focus detecting system as an active area; otherwise, the flow jumps to step #126 in FIG. 2 since manual focusing must be done.

In step #118 in FIG. 2, the microcomputer 165 checks the focus detecting area selection mode set by an operation switch or the like of the camera. The focus detecting area selection mode includes two modes, one of which is the arbitrary selection mode. In this mode, the photographer selects an arbitrary one or a plurality of permitted active focus detecting areas. The other mode is the automatic selection mode. In this mode, the camera automatically executes focus adjustment using all permitted active focus detecting areas. If the arbitrary selection mode is selected, the flow advances to step #119; otherwise, the flow jumps to step #121. In step #119, one or a plurality of focus detecting areas are determined on the basis of the output from a line of sight input means (not shown) for detecting the line of sight position of the photographer, or the output from a focus detecting area setting means comprising, e.g., a track ball (not shown). In step #120, the selected focus detecting areas are displayed superposed in the finder.

The microcomputer 165 checks in step #121 if the supplementary light mode is selected. If the supplementary light mode is selected, the flow advances to step #122 to issue a light-on instruction of supplementary light, and the flow then advances to step #123. On the other hand, if the supplementary light mode is not selected, the flow jumps to step #123. In step #123, the microcomputer 165 instructs the area sensor 111 to accumulate photocharges. The accumulation times are controlled in units of pixel regions to obtain a predetermined amount of photocharges, so that the strengths of image signals output in the subsequent step are nearly constant irrespective of the object luminance. Charges accumulated in accordance with the light amount distribution of the secondary object images are read out as image signals, and are stored in the RAM.

Subsequently, in step #124, the microcomputer 165 converts image signals read out from the predetermined light-receiving areas into a format suitable for focus detection in accordance with information of the focus detecting optical system stored in the EEPROM 164 upon completion of the image signal read. More specifically, the microcomputer 165 executes processing for adjusting curvatures by calculations for the first focus detecting system that splits the pupil vertically, and correction for converting the moving velocities of images upon defocus to a constant one. Next, the microcomputer 165 executes filtering to remove low-frequency components from the image signals of the first and second focus detecting systems, and detects the focus states of the focus detecting areas by known image spacing detection using the processed signals. If the focus detecting area selection mode is the arbitrary selection mode, the series of processes are done for the selected focus detecting area or areas; if the selection mode is the automatic selection mode, they are done for all the active focus detecting areas. Furthermore, reliable detection results are selected from all the focus detection results, and the defocus amount is derived from the selected information.

In step #125, the microcomputer 165 calculates the drive amount of the photographing lens on the basis of the defocus amount calculated in the previous step, and sends it to the photographing lens. The microcomputer 166 of the photographing lens drives the lens drive circuit 407 shown in FIG. 4 on the basis of this amount to adjust focus. In step #126, the microcomputer 165 checks the state of a switch SW2 that detects if the release button has been pressed to its full stroke position. As a result, if the switch SW2 is not ON, step #126 repeats itself. After that, if the switch SW2 is ON, the flow advances to step #127 to drive the shutter, thereby forming an object image on a photographing film by exposure. Subsequently, in step #128, the microcomputer 165 winds up the photographing film by one frame to prepare for the next photographing operation, thus returning to the beginning of the sequence.

According to the aforementioned embodiment, the ROM 162 in the camera stores focus detection permit information (information shown in FIG. 27 indicating the relationship between the full F number and focus detecting areas in accordance with the first and second focus detecting systems) in units of photographing lenses (including tele-conversion lenses attached thereto) that can be mounted on the camera.

When the full F number of the photographing lens mounted exceeds F5.6, it is checked if the ROM 162 in the camera stores focus detection permit information for the focus detecting area C0 at the center of the frame. If the center area permit information is stored therein, focus detection by the focus detecting area C0 is done.

More specifically, for a photographing lens system having a full F number larger than F5.6, focus detection by the central focus detecting area C0 of the first focus detecting system is permitted independent of the state of the photographing lens system if the area C0 is free from eclipse. On the other hand, for a photographing lens system having a full F number larger than F2.8, focus detection by the central focus detecting area C0 of the second focus detecting system is permitted independent of the state of the photographing lens system if the area C0 is free from eclipse.

With this control, even in a case of a camera/lens system that cannot be controlled by a conventional automatic focus adjustment system, since permission/inhibition of automatic focus detection is determined with reference to the focus detecting area C0 which suffers least eclipse of a light beam, the photographing lens conditions that permit automatic focus adjustment can be relaxed, thereby increasing the number of lenses capable of automatic focus adjustment.

When the full F number is larger than F5.6, since focus detection is permitted to only the central focus detecting area C0, the need for processing for repeating focus detection while search-driving the photographing lens to the infinity end and nearest distance end, and switching the driving mode to high-speed driving upon successful detection of defocus can be obviated, and the time required until an in-focus state is attained can be shortened.

Furthermore, when focus detection is done by only the central focus detecting area C0, a message indicating this is displayed, as shown in FIG. 3C. For this reason, the photographer can easily understand active focus detecting areas.

Note that the above embodiment has exemplified a single-lens reflex camera. However, the present invention can also be applied to various other cameras such as a video camera, electronic still camera, and the like, and optical devices and the like with a focus detecting function other than the cameras.

What is claimed is:

1. A camera which uses exchangeable photographing lenses, and is capable of a focus detection operation with respect to a plurality of focus areas, comprising:

a) storage means for storing information which relates to whether the camera is capable of the focus detection operation, when a full F number of a mounted photographing lens is larger than a predetermined F number, the information being set regardless of a state of the mounted photographing lens; and b) control means for controlling the focus detection operation on the basis of information corresponding to the mounted photographing lens, from among the information stored in said storage means.

2. A camera according to claim 1, wherein the information stored in said storage means relates to information as to whether the camera is capable of the focus detection operation with respect to a predetermined focus area, when the full F number of the mounted photographing lens is larger than the predetermined F number.

3. A camera according to claim 1, wherein the information stored in storage means relates to information as to whether the camera is capable of the focus detection operation with respect to a central focus area, when the full F number of the mounted photographing lens is larger than the predetermined F number.

4. A photographing lens for use with an exchangeable lens type camera, comprising:
   a) storage means for storing information which relates to whether the camera is capable of a focus detection operation, when a full F number of the photographing lens is larger than a predetermined F number, the information being set regardless of a state of the photographing lens; and
   b) output means for outputting the information stored in said storage means to the camera.

5. A photographing lens for use with an exchangeable lens type camera, comprising:
   a) storage means for storing information which relates to whether the camera is capable of a focus detection operation with respect to a predetermined focus area, when a full F number of the photographing lens is larger than a predetermined F number, the information being set regardless of a state of the photographing lens; and
   b) output means for outputting the information stored in said storage means to the camera.

6. A photographing lens for use with an exchangeable lens type camera, comprising:
   a) storage means for storing information which relates to whether the camera is capable of a focus detection operation with respect to a central focus area, when a full F number of the photographing lens is larger than a predetermined F number, the information being regardless of a state of the photographing lens: and
   b) output means for outputting the information stored in said storage means to the camera.

7. A camera capable of a focus detection operation with respect to a plurality of focus areas, comprising:
   a) detection means which relates a full F number of a photographing lens mounted on the camera;
   b) focus detection control means which compares the full F number detected by said detection means with a predetermined F number, permits the focus detection operation with respect to all of the plurality of focus areas when the full F number is smaller than the predetermined F number, and limits the number of focus areas which are permitted to perform the focus detection operation when the full F number is not less than the predetermined F number; and
   c) display means which displays focus areas for which the focus detection operation by said focus detection control means is permitted, such permitted focus areas displayed by said display means being set regardless of a state of the mounted photographing lens.

8. A camera capable of a focus detection operation with respect to a plurality of focus areas, comprising:
   a) detection means which detects a full F number of a photographing lens mounted on the camera;
   b) focus detection control means which compares the full F number detected by said detection means with a predetermined F number, permits the focus detection operation with respect to all focus areas when the full F number is smaller than the predetermined F number, and limits the focus areas which are permitted to perform the focus detection operation to specific focus areas when the full F number is not less than the predetermined F number; and
   c) display means which displays focus areas for which the focus detection operation by said focus detection control means is permitted, such permitted focus areas displayed by said display means being set regardless of a state of the mounted photographing lens.

9. A camera capable of a focus detection operation with respect to a plurality of focus areas, comprising:
   a) detection means which detects a full F number of a photographing lens mounted on the camera;
   b) focus detection control means which compares the full F number detected by said detection means with a predetermined F number, permits the focus detection operation with respect to all focus areas when the full F number is smaller than the predetermined F number, and limits the focus areas which are permitted to perform the focus detection operation to a focus area located at a center of the plurality of focus areas when the full F number is not less than the predetermined F number; and
   c) display means which displays focus areas for which the focus detection operation by said focus detection control means is permitted, such permitted focus areas displayed by said display means being set regardless of a state of the mounted photographing lens.

10. A camera capable of a focus detection operation with respect to a plurality of focus areas, comprising:
    a) a first focus detection optical system which splits an exit pupil of a photographing lens in a first direction;
    b) a second focus detection optical system which splits the exit pupil of the photographing lens in a second direction, where a focus area of said second focus detection optical system overlays a part of a focus area of said first focus detection optical system;
    c) detection means for detecting a full F number of the photographing lens; and
    d) focus detection control means for executing a focus detection operation with respect to all focus areas of said first detection optical system and all focus areas of said second focus detection optical system when the full F number detected by said detection means is smaller than a first predetermined F number, executing a focus detection operation with respect to all focus areas of said first focus detection optical system and a specific focus area of said second focus detection optical system when the full F number detected by said detection means is larger than the first predetermined F number and smaller than a second predetermined F number, and executing a focus detection operation with respect to a specific focus area of said first focus detection optical system when the full F number detected by said detection means is larger than the second predetermined F number.

11. A camera system capable of a focus detection operation with respect to a plurality of focus areas, comprising:
    a) a first focus detection optical system which splits an exit pupil of a photographing lens in a first direction;
    b) a second focus detection optical system which splits the exit pupil of the photographing lens in a second direction, where a focus area of said second focus detection optical system overlays a part of a focus area of said first focus detection optical system;
    c) detection means for detecting a full F number of the photographing lens; and
    d) focus detection control means for executing a focus detection operation with respect to all focus areas of said first detection optical system and all focus areas of said second focus detection optical system when the full F number detected by said detection means is smaller than a first predetermined F number, executing a focus detection operation with respect to all focus areas of said first focus detection optical system and a specific focus area of said second focus detection optical system when the full F number detected by said detection means is larger than the first predetermined F number and smaller than a second predetermined F number, and executing a focus detection operation with respect to a specific focus area of said first focus detection optical system when the full F number detected by said detection means is larger than the second predetermined F number.

12. A system according to claim 11, wherein the focus area of said first focus detection optical system and the specific focus area of said second focus detection system correspond to a central focus area.

13. A system according to claim 11, further comprising storage means for storing information which relates to whether the system is capable of the focus detection operation with respect to the specific focus area of said second focus detection optical system when the full F number detected by said detection means is larger than the first predetermined F number and smaller than the second predetermined F number, and wherein said focus detection control means executes a focus detection operation with respect to all focus areas of said first focus detection optical system and the specific focus area of said second focus detection optical system when the information stored in said storage means indicates that the system is capable of the focus detection operation with respect to the specific focus area of said second focus detection optical system, and the full F number detected by said detection means is larger than the first predetermined F number and smaller than the second predetermined F number.

14. A system according to claim 13, wherein said storage means is provided in a camera body.

15. A system according to claim 13, wherein said storage means is provided in the photographing lens.

16. A system according to claim 13, wherein when the full F number detected by said detection means is larger than the first predetermined F number and smaller than the second predetermined F number, and a light beam for facilitating a focus detection operation is projected, said focus detection control means executes the focus detection operation with respect to all focus areas of said first focus detection optical system and the specific focus area of said second focus detection optical system regardless of whether the information stored in said storage means indicates that the system is capable of the focus detection operation with respect to the specific focus area of said second focus detection optical system.

17. A system according to claim 11, further comprising storage means for storing information which relates to whether the system is capable of the focus detection operation with respect to the specific focus area of said first focus detection optical system when the full F number detected by said detection means is larger than the second predetermined F number, wherein said focus detection control means executes the focus detection operation with respect to the specific focus area of said first focus detection optical system when the information stored in said storage means indicates that the system is capable of the focus detection operation with respect to the specific focus area of the first focus detection optical system, and when the full F number detected by said detection means is larger than the second predetermined F number.

18. A system according to claim 17, wherein said storage means is provided in a camera body.

19. A system according to claim 17, wherein said storage means is provided in the photographing lens.

20. A camera system which uses exchangeable photographing lenses, and is capable of a focus detection operation with respect to a plurality of focus areas, comprising:

a) storage means for storing information which relates to whether the camera is capable of the focus detection operation for each of plural photography lenses, when a full F number of a mounted photographing lens is larger than a predetermined F number, the information being set regardless of a state of the mounted photographing lens; and b) control means for controlling the focus detection operation on the basis of information corresponding to the mounted photographing lens, from among the information stored in said storage means.

21. A camera system capable of a focus detection operation with respect to a plurality of focus areas, comprising:

a) detection means which detects a full F number of a photographing lens of the camera system;

b) focus detection control means which compares the full F number detected by said detection means with a predetermined F number, permits the focus detection operation with respect to all of the plurality of focus areas when the full F number is smaller than the predetermined F number, and limits the number of focus areas which are permitted to perform the focus detection operation when the full F number is not less than the predetermined F number; and c) display means which displays focus areas for which the focus detection operation by said focus detection control means is permitted, such permitted focus areas displayed by said display means being set regardless of a state of a mounted photographing lens.

22. A camera system capable of a focus detection operation with respect to a plurality of focus areas, comprising:

a) detection means which detects a full F number of a photographing lens of the camera system;

b) focus detection control means which compares the full F number detected by said detection means with a predetermined F number, permits the focus detection operation with respect to all focus areas when the full F number is smaller than the predetermined F number, and limits the focus areas which are permitted to perform the focus detection operation to specific focus areas when the full F number is not less than the predetermined F number; and c) display means which displays focus areas for which the focus detection operation by said focus detection control means is permitted, such permitted focus areas displayed by said display means being set regardless of a state of a mounted photographing lens.

23. A camera system capable of a focus detection operation with respect to a plurality of focus areas, comprising:

a) detection means which detects a full F number of a photographing lens of the camera system;

b) focus detection control means which compares the full F number detected by said detection means with a predetermined F number, permits a focus detection operation with respect to all focus area when the full F number is smaller than the predetermined F number, and limits the focus areas which are permitted to perform the focus detection operation to a focus area located at a center of the plurality of areas focus areas when the full F number is not less than the predetermined F number; and c) display means which displays focus areas for which the focus detection operation by said focus detection control means is permitted, such permitted focus areas displayed by said display means being set regardless of a state of a mounted photographing lens.

* * * * *

UNITED STATES PATENT AND TRADEMARK OFFICE
CERTIFICATE OF CORRECTION

PATENT NO. : 6,112,029

DATED : August 29, 2000

INVENTOR(S): YASUO SUDA

It is certified that error appears in the above-identified patent and that said Letters Patent is hereby corrected as shown below:

COLUMN 3:

Line 24, "informations" should read --information--.

COLUMN 9:

Line 15, "∆1, ∆2, and ∆3" should read --Θ1, Θ2, and Θ3--.
Line 19, "∆1<∆2<∆3" should read --Θ1<Θ2<Θ3--.
Line 20, "∆1, ∆2, and ∆3" should read --Θ1, Θ2, and Θ3--.

COLUMN 19:

Line 32, "being" should read --being set--.
Line 38, "relates" should read --detects--.

Signed and Sealed this

Twenty-ninth Day of May, 2001

Attest:

NICHOLAS P. GODICI

Attesting Officer    Acting Director of the United States Patent and Trademark Office